(12) United States Patent
Riley et al.

(10) Patent No.: US 8,166,097 B2
(45) Date of Patent: *Apr. 24, 2012

(54) USING DISTRIBUTED QUEUES IN AN OVERLAY NETWORK

(75) Inventors: John Reed Riley, Bellevue, WA (US); David A. Wortendyke, Seattle, WA (US); Michael J. Marucheck, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/215,015

(22) Filed: Aug. 22, 2011

(65) Prior Publication Data

US 2012/0005254 A1 Jan. 5, 2012

Related U.S. Application Data

(63) Continuation of application No. 13/101,858, filed on May 5, 2011, now Pat. No. 8,032,578, which is a continuation of application No. 12/490,215, filed on Jun. 23, 2009, now Pat. No. 7,984,094.

(51) Int. Cl.
*G06F 15/16* (2006.01)
(52) U.S. Cl. ......... 709/201; 709/223; 709/251; 711/147
(58) Field of Classification Search .................. 709/200, 709/201, 223, 251; 714/4.1, 1; 711/147
See application file for complete search history.

(56) References Cited

U.S. PATENT DOCUMENTS

| 6,317,806 | B1 * | 11/2001 | Audityan et al. ............. 711/101 |
| 7,080,221 | B1 * | 7/2006 | Todd et al. ................... 711/161 |
| 7,221,377 | B1 | 5/2007 | Okita |
| 7,526,523 | B2 | 4/2009 | Nekovee |
| 7,577,799 | B1 * | 8/2009 | Howard et al. ............... 711/147 |
| 7,680,879 | B2 * | 3/2010 | Battat et al. .................. 709/203 |
| 2005/0198286 | A1 | 9/2005 | Xu |
| 2007/0233835 | A1 | 10/2007 | Kushalnagar et al. |
| 2008/0181135 | A1 | 7/2008 | Yalagandula |
| 2008/0253402 | A1 | 10/2008 | Prudden |
| 2009/0116484 | A1 | 5/2009 | Buford |
| 2009/0125637 | A1 | 5/2009 | Matuszewski |
| 2010/0322256 | A1 | 12/2010 | Riley |

FOREIGN PATENT DOCUMENTS

| WO | W02008102195 | 8/2008 |
| WO | W02009071971 A2 | 8/2009 |

OTHER PUBLICATIONS

Yoshikawa, Chad, et al., "Distributed Hash Queues: Architecture & Design", 2008, 12 pages.

(Continued)

*Primary Examiner* — Frantz Jean
(74) *Attorney, Agent, or Firm* — Workman Nydegger

(57) ABSTRACT

The present invention extends to methods, systems, and computer program products for using distributed queues in an overlay network. Embodiments of the invention can be used to replicate queue state (e.g., inserted and/or deleted messages) within an overlay network and can be used to continue a process at a different node within the overlay network based on replicated queue state. Accordingly, embodiments of the invention can be used to increase the availability of queue state, compensate for node failures within an overlay network, and promote replication of consistent queue state between nodes within an overlay network.

20 Claims, 16 Drawing Sheets

OTHER PUBLICATIONS

Tati, Kiran, et al., "ShortCuts: Using Soft State to Improve DHT Routing", Jul. 2006, 18 pages.
Andersen, David, et al., "Resilient Overlay Networks", 18th ACM Symp. on Operating Systems Principles (SOSP), Oct. 2001, 15 pages.
Wu, Yinghui, et al., "ONSP: Parallel Overlay Network Simulation Platform", 2004, 12 pages.
Wilcox, Matthew, "I'll Do It Later: Softirqs, Tasklets, Bottom Halves, Task Queues, Work Queues and Timers", 2002, 6 pages.
Wikipedia, "Distributed hash table", 2009, 7 pages.
The Bamboo Distributed Hash Table, 2004, 4 pages.
Oracle, "Timer and Work Manager API (CommonJ) Programmer's Guide" The Timer and Work Manager API, 2008, 9 pages.
Notice of Allowance for U.S. Appl. No. 12/490,215 dated Apr. 1, 2011, 18 pages.
Notice of Allowance for U.S. Appl. No. 13/101,858 dated Jun. 23, 2011, 11 pages.
Office Action mailed Apr. 12, 2011 cited in U.S. Appl. No. 12/490,213.
Notice of Allowance mailed Jun. 10, 2011 cited in U.S. Appl. No. 12/490,213.
Notice of Allowance mailed Jul. 15, 2011 cited in U.S. Appl. No. 12/490,213.

* cited by examiner

USING DISTRIBUTED QUEUES IN AN OVERLAY NETWORK

CROSS-REFERENCE TO RELATED APPLICATIONS

This application is a continuation of U.S. patent application Ser. No. 13/101,858, now U.S. Pat. No. 8,032,578, entitled "USING DISTRIBUTED QUEUES IN AN OVERLAY NETWORK", filed May 5, 2011, which is incorporated herein in its entirety. That application is a continuation of U.S. patent application Ser. No. 12/490,215, now U.S. Pat. No. 7,984,094, entitled "USING DISTRIBUTED QUEUES IN AN OVERLAY NETWORK", filed Jun. 23, 2009, which is incorporated herein in its entirety.

BACKGROUND

Background and Relevant Art

Computer systems and related technology affect many aspects of society. Indeed, the computer system's ability to process information has transformed the way we live and work. Computer systems now commonly perform a host of tasks (e.g., word processing, scheduling, accounting, etc.) that prior to the advent of the computer system were performed manually. More recently, computer systems have been coupled to one another and to other electronic devices to form both wired and wireless computer networks over which the computer systems and other electronic devices can transfer electronic data. Accordingly, the performance of many computing tasks are distributed across a number of different computer systems and/or a number of different computing environments.

In some computing environments, messages are temporary stored (or "queued") in a queue prior to processing. The queue provides buffer capabilities to compensate for differences connection speeds, to permit asynchronous communication, etc. A queue and the service that utilizes data from the queue are typically run on a single computer system. Unfortunately, this can result in a bottle neck for data processing. As the number of other computer systems sending data to the queue increases, the response time of the service decreases. At some volume of data, the queue and/or the server may lack sufficient resources to process the data in a timely manner (or at all).

Further, typical queue arrangements result in a single point of failure for the server. That is, if the queue or machine where the queue is running malfunction or crash, queue state can be lost. When the queue is restarted, there may be no way for the queue to regain the lost queue state. Accordingly, computer systems may be required to resubmit data to the queue to get it processed.

In general, the potential for a data bottle neck and/or loss of queue state tends to reduce queue availability. That is, if a queue is overwhelmed or busy, other computer systems may view the queue as unable to process data. Further, when queue state is lost, other computer systems can also view the queue as unable to process data. In either case, the queue (even if running) is essentially unavailable for its intended purpose.

Machines can be clustered to provide increased availability for queues. For example, a database can be run on a cluster. Messages can be written to the database durably and then replicated to other machines on the cluster. However, clustering requires the allocation of resources for durable storage to increase availability. Thus, facilitating increased queue availability through clustering and durable storage may not be an efficient allocation of resources when the queued data is short lived and some data loss is tolerable.

BRIEF SUMMARY

The present invention extends to methods, systems, and computer program products for using distributed queues in an overlay network. In some embodiments, queue state is replicated within an overlay network. Data is received for a process at a node. The node includes a process runtime for running the process and a queue for queuing data for the process. The process runtime and the queue are co-located within the process at the node. The node is assigned responsibility for a specified range of identifiers on the overlay network. The process is identified by an identifier within the specified range of identifiers.

The received data is queued in the queue. The queue state for the queue is altered in response to queueing the received data. The altered queue state is replicated to a plurality of other nodes on the overlay network. Replicating the altered queue state increases the availability of the altered queue state. As such, if responsibility for the process is subsequently reassigned to one of the plurality of other nodes, the altered queue state is available to a process runtime at the reassigned node.

The received data is dequeued from the queue to the process runtime within the process. The process runtime processes the received data to perform some work. The queue state is further altered in response to the received data being dequeued. Subsequent to successful performance of the work, the further altered queue state is replicated to the plurality of other nodes on the overlay network. Replicating the further altered queue state subsequent to successful performance of the work helps insure that the plurality of other nodes retain appropriate replicated queue state.

In other embodiments a node assumes ownership of a process within an overlay network. The node receives replicated queue state for a remote queue at another node on the overlay network. The replicated queue state represents that a process has partially completed a portion of work at the other node. The process including the remote queue and a remote process runtime co-located within the process at the other node. The replicated queue state includes an identifier that identifies the process on the overlay network. The identifier is outside the specified range of identifiers assigned to the node.

A change is detected in the node configuration on the overly network subsequent to receiving the replicated queue state. The specified range of identifiers for the node is updated based on the detected change in node configuration. The update to the specified range of identifiers changes the assigned responsibilities for the node. It is determined that the identifier identifying the process is within the updated specified range of identifiers. As such, the node has been assigned responsibility for the process in view of the changed node configuration.

The node locally activates the process in response to determining that the node is responsible for the process. A queue and a process runtime for the process are co-located within the process at the node. The replicated queue state is utilized to adjust the state of the queue at the node. The process runtime at the node processes data from the queue at the node to continue the portion of work from the point of partial completion reached at the other node based on the replicated queue state.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Figure 1A:
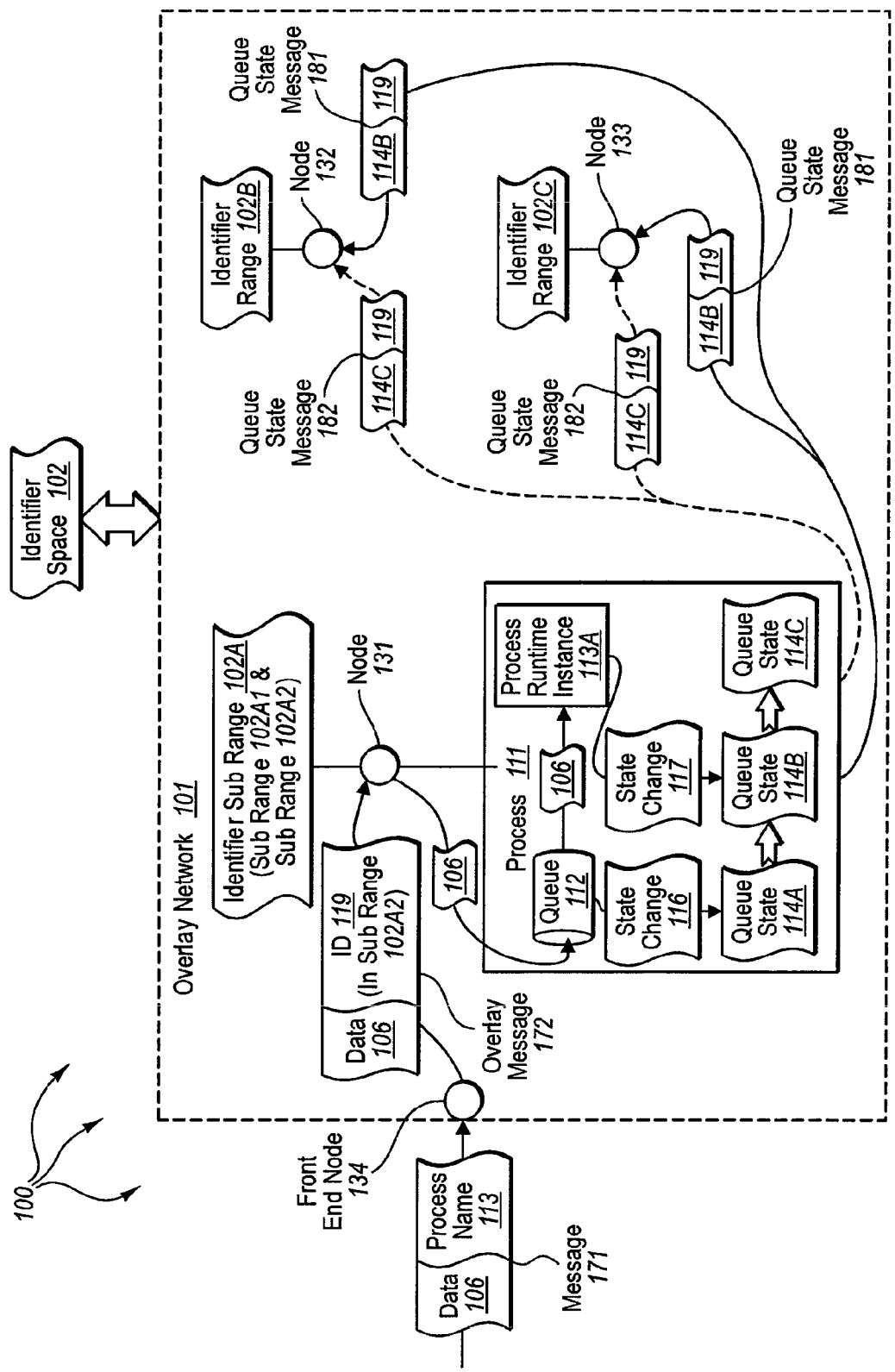
FIG. 1A illustrates an example computer architecture that facilitates replicating queue state within an overlay network.

The present invention extends to methods, systems, and computer program products for using distributed queues in an overlay network. In some embodiments, queue state is replicated within an overlay network. Data is received for a process at a node. The node includes a process runtime for running the process and a queue for queuing data for the process. The process runtime and the queue are co-located within the process at the node. The node is assigned responsibility for a specified range of identifiers on the overlay network. The process is identified by an identifier within the specified range of identifiers.

The received data is queued in the queue. The queue state for the queue is altered in response to queueing the received data. The altered queue state is replicated to a plurality of other nodes on the overlay network. Replicating the altered queue state increases the availability of the altered queue state. As such, if responsibility for the process is subsequently reassigned to one of the plurality of other nodes, the altered queue state is available to a process runtime at the reassigned node.

The received data is dequeued from the queue to the process runtime within the process. The process runtime processes the received data to perform some work. The queue state is further altered in response to the received data being dequeued. Subsequent to successful performance of the work, the further altered queue state is replicated to the plurality of other nodes on the overlay network. Replicating the further altered queue state subsequent to successful performance of the work helps insure that the plurality of other nodes retain appropriate replicated queue state.

In other embodiments a node assumes ownership of a process within an overlay network. The node receives replicated queue state for a remote queue at another node on the overlay network. The replicated queue state represents that a process has partially completed a portion of work at the other node. The process including the remote queue and a remote process runtime co-located within the process at the other node. The replicated queue state includes an identifier that identifies the process on the overlay network. The identifier is outside the specified range of identifiers assigned to the node.

A change is detected in the node configuration on the overly network subsequent to receiving the replicated queue state. The specified range of identifiers for the node is updated based on the detected change in node configuration. The update to the specified range of identifiers changes the assigned responsibilities for the node. It is determined that the identifier identifying the process is within the updated specified range of identifiers. As such, the node has been assigned responsibility for the process in view of the changed node configuration.

The node locally activates the process in response to determining that the node is responsible for the process. A queue and a process runtime for the process are co-located within the process at the node. The replicated queue state is utilized to adjust the state of the queue at the node. The process runtime at the node processes data from the queue at the node to continue the portion of work from the point of partial completion reached at the other node based on the replicated queue state.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: computer storage media and transmission media.

Computer storage media includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

Within this description and following claims, a "physical network" is defined as one or more data links that enable the transport of electronic data between computer systems and/or modules and/or other electronic devices.

Within this description and in the following claims, an "overlay network" is defined as a computer network that is built on top of another network (e.g., a physical network or another overlay network). Nodes on an overlay network can be viewed as being connected by virtual or logical links, each of which corresponds to a path, perhaps through many physical networks and/or data links, in an underlying network. For example, many peer-to-peer networks are overlay networks because they run on top of the Internet. Overlay networks can be constructed in order to permit routing messages to destinations not specified by an IP address. For example, distributed hash tables can be used to route messages to a node having specific logical address, whose IP address is not known in advance. Overly networks can be of various configurations, including rings as described in greater detail below.

When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system (or "node") configurations. A computer system or node can include one or more processors and systems memory. For example, a computer system or node can be any of: personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

In some embodiments, hardware modules, such as, for example, special purpose integrated circuits or Gate-arrays are optimized to represent a node that implements the principles of the present invention.

Using Replicated Queue State on an Overlay Network

Figure 1B:
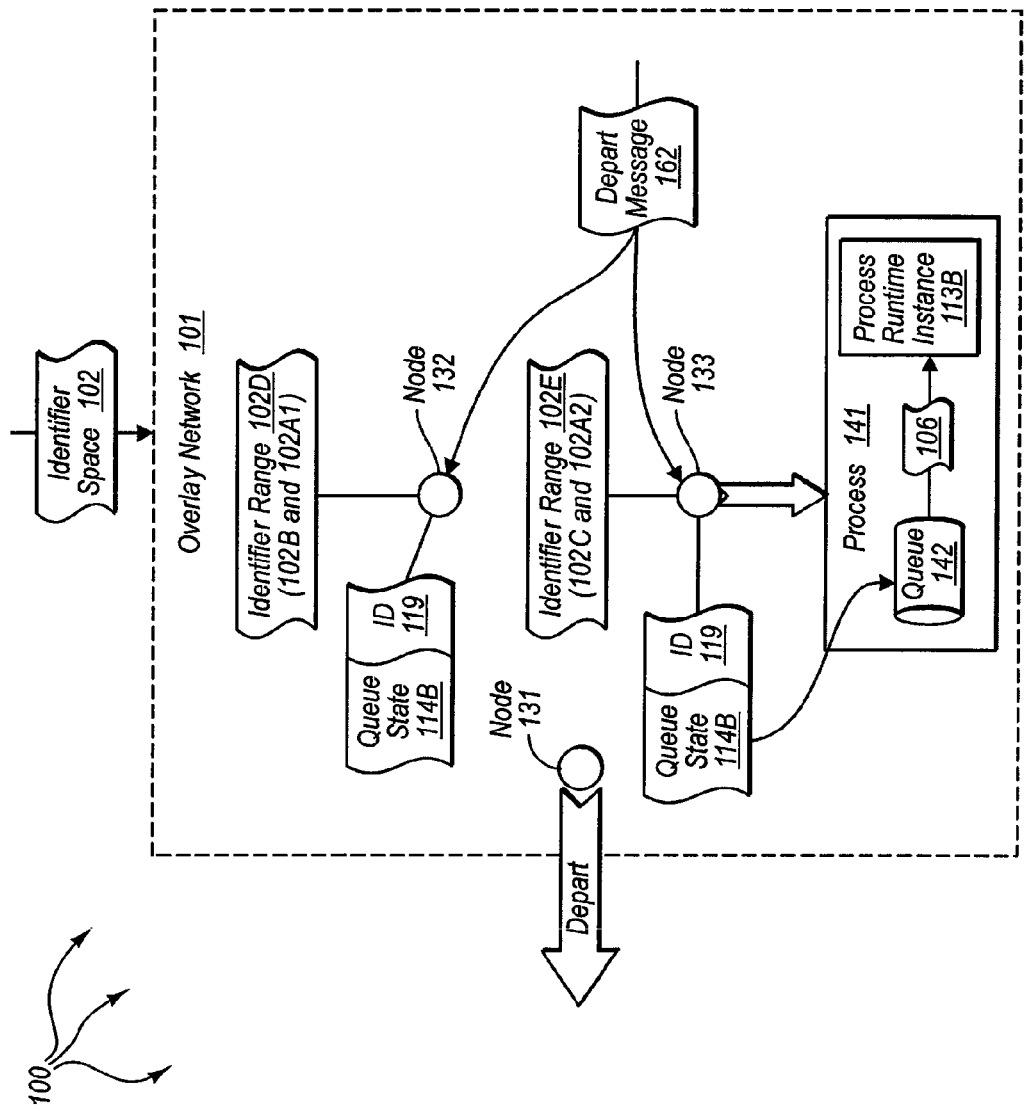
FIG. 1B illustrates an example computer architecture that facilitates assuming ownership of a process within an overlay network.

FIG. 1A illustrates an example computer architecture 100 that facilitates replicating queue state within an overlay network 101. FIG. 1B illustrates example computer architecture 100 that facilitates assuming ownership of a process within an overlay network 101. As depicted, computer architecture 100 includes overlay network 101. Overlay network 101 can be built on top of virtually any type of underlying network such as, for example, a Local Area Network ("LAN"), a Wide Area Network ("WAN"), and even the Internet. Accordingly, each node of overlay network 101 can create message related data and exchange message related data using overlay protocols. The overlay protocols can be based on Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), etc.

Overlay network 101 includes a plurality of nodes including nodes 131, 132, and 133 and front end node 134. Identifier space 102 can be used to identify components within overlay network 102. Identifier space 102 can be configured with a sufficient number of unique identifiers based on the functionality that is being provided in overlay network. Nodes within overlay network 101 can implement identifier assignment protocols between one another that coordinate assigning responsibility for sub ranges of identifiers within identifier space 102. Thus, implementing these protocols, nodes within overlay network 101 can be assigned responsibility for sub ranges of identifiers within identifier space 102. For example, nodes 131, 132, and 133 are assigned responsibility for identifier sub ranges 102A, 102B, and 102C respectively.

Nodes within overlay network 101 can also implement routing protocols for routing messages between one another to the node that is responsible for the message. Messages received at overlay network 101 can include an identifier from within identifier space 102. Thus, messages received at overlay network 101 can be routed between nodes to the node that is assigned responsibility for the identifier. The responsible node then provides the appropriate functionality for processing any data contained in the message.

Overly network 101 can include one or more front end nodes, such as, for example, front end node 134. A front end node is a node that interfaces between overly network 101 and systems that are external to network overlay network 101. Front end nodes can participate in addressing schemes external to overlay network 101. As such, external systems can direct messages to a front end node to utilize functionality offered in overlay network 101.

For example, a computer system external to overlay network 101 can send message 171 to front end node 134. As depicted, message 171 includes data 106 and process name 113 (e.g., the name of a workflow). Process name 113 can be the name of a process that is to process data 106. Front end node 134 can receive message 171 and correspondingly configure overlay message 172 for routing within overlay network 101. Overlay message 172 includes data 106 and overlay ID 119. Front end node 134 can implement an appropriately configured hashing algorithm to hash process name 111 into overlay identifier 119 (an identifier within identifier space 102). For example, overlay identifier 119 is within identifier sub range 102A and more specifically within sub range 102A2.

Front end node 134 can implement appropriate routing protocols to initiate routing overlay message 172 to the node assigned responsibility for overlay ID 119. Message 172 can be routed through one or more other nodes in overlay network 101 before arriving at node 131 (the node assigned responsibility for overlay identifier 119). Nodes on overlay network 101 can have access to executable instructions for activating various different processes to process data. From an overlay identifier, a node can determine what process to activate. For example, upon receiving overlay identifier 119, node 131 can determine that it is to activate a queue and process instance for process name 113. As such, node 131 can activate queue 112 and process run time instance 113A (e.g., a workflow instance) within process 111.

Node 131 can then send data 106 to process 111 for processing. During processing, data 106 can be queued in queue 112. Queuing data 106 in queue 112 can change the queue state of queue 112. Process 111 can reflect the change in state in state change 116. Process 111 can apply state change 116 to queue state 114A to cause the state of queue 112 to transition to queue state 114B.

Node 131 can also replicates queue state 114B to other nodes in overlay network 101. Generally, replicating queue state can be used to assist in recovering from node malfunctions, when a node leaves an overlay, etc. For example, when one node leaves an overlay, another node with access to replicated queue state can assume the responsibilities of the leaving node. The assuming node can use the replicated state to transition a queue into the same state as a queue at the leaving node at the time it left the overlay. Replicating queue state can include replicating inserted messages before beginning to process them (such that a copy of the inserted message without any alterations due to processing is available). Replicating queue state can also include replicating deleted messages after they have been processed.

Node 131 can utilize appropriate routing protocols to send messages containing queue state 114B to overlay IDs assigned to the one or more other nodes. For example, node 131 send queue state message 181 to nodes 132 and 133. As depicted, queue state message 181 includes both queue state 114B (e.g., inserted and/or deleted messages) and overlay ID 119. A node receiving queue state message 181 can user overlay ID 119 to determine responsibility for queue state 114B. From time to time, or upon a change the configuration of nodes in overlay network 101, nodes receiving replicated queue state can determine if they are responsible for the replicated queue state.

As other changes in the state of queue 112 occur, these state changes can also be replicated to other nodes in overlay network 101. For example, data 106 can be dequeued from queue 112 to process runtime instance 113A. Dequeuing data 106 from queue 112 can further change the queue state of queue 112. Process 111 can reflect the change in state in state change 117. Process 111 can apply state change 117 to queue state 114B to cause the state of queue 112 to transition to queue state 114C.

Process runtime instance 113A can process data 106 to partially complete a portion of work. Upon successfully processing of data 106, process 111 can replicate queue state 114C to other nodes in overlay network 101. Node 131 can utilize appropriate routing protocols to send messages containing queue state 114C to overlay IDs assigned to the one or more other nodes. For example, node 131 send queue state message 182 to nodes 132 and 133. As depicted, queue state message 182 includes both queue state 114C (e.g., inserted and/or deleted messages) and overlay ID 119. Upon receiving queue state message 182, nodes 132 and 133 can overwrite queue state 114B with queue state 114C. Nodes 132 and 133 can used overlay ID 119 to match queue state 114B with queue state 114C.

As depicted in FIG. 1A, queue 112 and process runtime instance 113A are co-located within the same process. Thus, if process 111 fails both queue 112 and process runtime instance 113A fail as well. Further, and as previously described, replicating queue state changes related to dequeueing data are deffered until successful processing of the dequeued data. Co-location of queue and process runtime instance and deferred replication of queue state help insure that other nodes receiving replicated queue state retain appropriate replicated queue state.

For example, deferring queue state replication for dequeued data until after successful processing reduces the chance of queue state inconsistencies between process 111 and other nodes. That is, there is a reduced chance for replicating queue state 114B and then having process runtime instance 113A fail to successfully process data 106, which could result in reversion to queue state 114A. Further, co-location of queue 112 and process runtime instance 113A increases the chance of operational consistency between queue 112 and process runtime instance 113A. That is, it is unlikely that one of queue 112 and process runtime instance 113A could fail without the other failing as well.

As previously described, nodes receiving replicated queue state can determine if they are responsible for the replicated queue state (e.g., inserted and/or deleted messages). When a node is not responsible for replicated queue state the node does not attempt to process the queue state. For example, when node 131 is assigned responsibility for overlay identifier 119, neither node 132 nor node 133 attempts to process queue state 114B or 114C.

However, it may be that responsibility for overlay identifier 119 (and thus responsibility for process name 113) changes after process instance 1113 replicates queue state 114B or 114C. For example, when the node configuration in overlay network 101 changes, identifier assignment protocols can re-assign responsibility for different sub ranges of identifier space 102. For example, when a node joins overly network 101, portions of existing identifier ranges for one or more existing nodes can be re-assigned from the one or more existing nodes to the joining node. Likewise, when a node departs from overlay network 101, portions of the identifier range assigned to the leaving node can be re-assigned to one or more remaining nodes.

Thus, if node 131 departs overlay network 101 (either in an orderly manner or due to a malfunction (crash, loss of power, etc.)), portions of identifier range 102A can be re-assigned to other remaining nodes, such as, for example, nodes 132 and 133. Referring now to FIG. 1B, node 131 departs overlay network 101. Nodes in overlay network 101 can receive depart message 162 indicating that node 131 has departed.

In response to the departure of node 131, identifier assignment protocols re-assign responsibility for identifier sub range 102A. Responsibility for sub range 102A is split between nodes 133 and 133. Identifier sub range 102A1 is re-assigned to node 132. Thus, node 132 is assigned responsibility for identifier sub range 102D, including identifier sub range 102B and identifier sub range 102A1. Similarly, identifier sub range 102A2 is re-assigned to node 133. Thus, node 133 is now assigned responsibility for identifier sub range 102E, including identifier sub range 102C and identifier sub range 102A2.

Subsequent to be re-assigned responsibility for identifier sub-range 102A2, node 133 can determine that it is (now) assigned responsibility for overlay identifier 119 (and thus process name 113). As such, node 133 can activate a queue and process runtime instance for processing queue state 114B. For example, node 133 can activate queue 142 and process runtime instance 113B (e.g., another workflow instance for process name 113) within process 141.

Node 133 can then apply queue state 114B to queue 142. Applying queue state 114B causes queue 142 to transition to a previously known state of queue 112 (e.g., having data 106 queued). Data 106 can then be dequeued from queue 142 to process runtime instance 113B for processing. Accordingly, process instance runtime 113B can continue performing portion of work from the point of partial completion reached at process instance runtime 113A.

Thus, embodiments of the invention permit other nodes in an overlay network to make progress on a portion of work when the node that originated the portion of work is down. Accordingly, embodiments of the invention significantly increase the likelihood that work can be completed within an overlay network.

Ring Overlay Network

Embodiments of the invention can be practiced using various different types of overlay networks. In some embodiments, the invention is practiced using a ring overlay network. In a ring overlay network, nodes federate with one another to form a ring. Nodes on a ring can federate together using a variety of different mechanisms. Accordingly, a ring overlay network consists of a federated set of nodes that cooperate among themselves to form a dynamic and scalable network in which information can be systematically and efficiently disseminated and located.

Nodes are organized to participate in a federation as a sorted list using a binary relation that is reflexive, anti-symmetric, transitive, total, and defined over the domain of node identities. Both ends of the sorted list are joined, thereby forming a ring. Thus, each node in the list can view itself as being at the middle of the sorted list (as a result of using modulo arithmetic). Further, the list is doubly linked so that any node can traverse the list in either direction.

Each federating node can be assigned an ID (e.g., by a random number generator with duplicate detection) from a fixed set of IDs between 0 and some fixed upper bound. Thus, adding 1 to an ID of the fixed upper bound results in an ID of zero (i.e., moving from the end of the linked list back to the beginning of the linked list). In addition, a 1:1 mapping function from the value domain of the node identities to the nodes themselves is defined.

Figure 2:
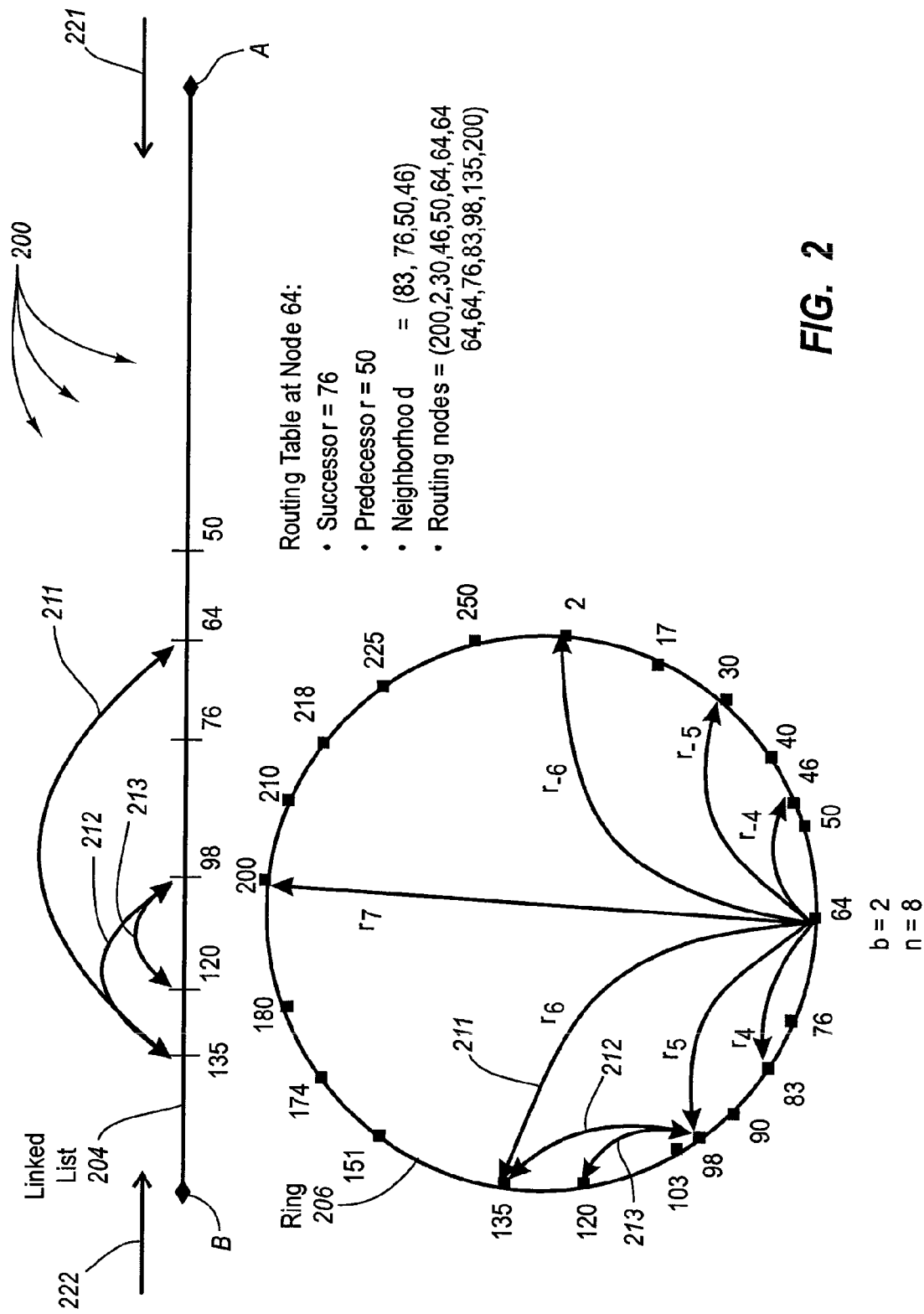
FIG. 2 illustrates an example binary relationship between nodes in a federation infrastructure in the form of a sorted list and corresponding ring.

FIG. 2 illustrates an example binary relationship between nodes in a federation infrastructure in the form of a sorted list 204 and corresponding ring 206. Given such a ring, the following functions can be defined:

RouteNumerically(V, Msg): Given a value V from the value domain of node identities and a message "Msg," deliver the message to node X whose identity can be mapped to V using the mapping function.

Neighborhood(X, S): Neighborhood is the set of nodes on the either side of node X with cardinality equal to S.

When every node in the federation has global knowledge of the ring, RouteNumerically(V, Msg) is implemented by directly sending Msg to the node X, whose identity is obtained by applying the mapping function to V. Alternately, when nodes have limited knowledge of other nodes (e.g., only of immediately adjacent nodes), RouteNumerically(V, Msg) is implemented by forwarding the message to consecutive nodes along the ring until it reaches the destination node X.

Alternately (and advantageously), nodes can store enough knowledge about the ring to perform a distributed binary search (without having to have global knowledge or implement routing between immediately adjacent nodes). The amount of ring knowledge is configurable such that maintaining the ring knowledge has a sufficiently small impact on each node but allows increased routing performance from the reduction in the number of routing hops.

As previously described, IDs can be assigned using the "<" (less than) relation defined over a sufficiently large, bounded set of natural numbers, meaning its range is over a finite set of numbers between 0 and some fixed value, inclusive. Thus, every node participating in the federation is assigned a natural number that lies between 0 and some appropriately-chosen upper bound, inclusive. The range does not have to be tight and there can be gaps between numbers assigned to nodes. The number assigned to a node serves as its identity in the ring. The mapping function accounts for gaps in the number space by mapping a number falling in between two node identities to the node whose identity is numerically closest to the number.

This approach has a number of advantages. By assigning each node a uniformly-distributed number, there is an increased likelihood that all segments of the ring are uniformly populated. Further, successor, predecessor, and neighborhood computations can be done efficiently using modulo arithmetic.

In some embodiments, federating nodes are assigned an ID from within an ID space so large that the chances of two nodes being assigned the same ID are highly unlikely (e.g., when random number generation is used). For example, a node can be assigned an ID in the range of 0 to $b^n-1$, where b equals, for example, 8 or 16 and n equals, for example, 128-bit or 160-bit equivalent digits. Accordingly, a node can be assigned an ID, for example, from a range of 0 to $16^{40}-1$ (or approximately 1.461502E48). The range of 0 to $16^{40}-1$ would provide, for example, a sufficient number of IDs to assign every node on the Internet a unique ID.

Thus, each node in a federation can have:

An ID which is a numerical value uniformly distributed in the range of 0 to $b^n-1$; and A routing table consisting of (all arithmetic is done modulo $b^n$):

Successor node (s);

Predecessor node (p);

Neighborhood nodes $(p_k, \ldots, p_1, p, s, s_1, \ldots, s_j)$ such that $s_j.s.id>(id+u/2)$, $j \geq v/2-1$, and $p_k.p.id<(id-u/2)$, and $k>v/2-1$; and Routing nodes $(r_{-(n-1)}, \ldots, r_{-1}, r_1, \ldots, r_{n-1})$ such that $r_{\pm i}$, =RouteNumerically($id \pm b^i$, Msg).

where b is the number base, n is the field size in number of digits, u is the neighborhood range, v is the neighborhood size, and the arithmetic is performed modulo $b^n$. For good routing efficiency and fault tolerance, values for u and v can be u=b and v≧max($\log_2(N)$, 4), where N is the total number of nodes physically participating in the federation. N can be estimated from the number of nodes present on a ring segment whose length is greater than or equal to b, for example, when there is a uniform distribution of IDs. Typical values for b and n are b=8 or 16 and n=128-bit or 160-bit equivalent digits.

Accordingly, routing nodes can form a logarithmic index spanning a ring. Depending on the locations of nodes on a ring, a precise logarithmic index is possible, for example, when there is an existing node at each number in the set of id±$b^i$ where i=(1, 2, . . . (n−1)). However, it may be that there are not existing nodes at each number in the set. In those cases, a node closest to id±$b^i$ can be selected as a routing node. The resulting logarithmic index is not precise and may even lack unique routing nodes for some numbers in the set.

Referring again to FIG. 2, FIG. 2 illustrates an example of a binary relation between nodes in a federation infrastructure in the form of sorted list 204 and corresponding ring 206. The ID space of sorted list 204 is in the range 0 to $2^8$−1 (or 255). That is, b=2 and n=8. Thus, nodes depicted in FIG. 2 are assigned IDs in a range from 0 to 255. Sorted list 204 utilizes a binary relation that is reflexive, anti-symmetric, transitive, total, and defined over the domain of node identities. Both ends of sorted list 204 are joined, thereby forming ring 206. This makes it possible for each node in FIG. 2 to view itself as being at the middle of sorted list 204. The sorted list 204 is doubly linked so that any node can traverse the sorted list 204 in either direction. Arithmetic for traversing sorted list 204 (or ring 206) is performed modulo $2^8$. Thus, ID 255 (or the end of sorted list 204)+1=0 (or the beginning of sorted list 204).

The routing table indicates that the successor to ID 64 is ID 76 (the ID immediately clockwise from ID 64). The successor can change, for example, when a new node (e.g., with an ID of 71) joins or an existing node (e.g., ID 76) leaves the federation infrastructure. Likewise, the routing table indicates that the predecessor to ID 64 is ID 50 (the ID immediately counters clockwise from ID 64). The predecessor can change, for example, when a new node (e.g., with an ID of 59) joins or an existing node (e.g., ID 50) leaves the federation infrastructure.

The routing table further indicates that a set of neighborhood nodes to ID 64 have IDs 83, 76, 50 and 46. A set of neighbor nodes can be a specified number of nodes (i.e., neighborhood size v) that are within a specified range (i.e., neighbor range u) of ID 64. A variety of different neighborhood sizes and neighbor ranges, such as, for example, V=4 and U=10, can potentially be used to identify the set of neighborhood nodes. A neighborhood set can change, for example, when nodes join or leave the federation infrastructure or when the specified number of nodes or specified range is changed.

The routing table further indicates that ID 64 can route to nodes having IDs 200, 2, 30, 46, 50, 64, 64, 64, 64, 76, 83, 98, 135, and 200. This list is generated by identifying the node closest to each number in the set of id±$2^i$ where i=(1, 2, 3, 4, 5, 6, 7). That is, b=2 and n=8. For example, the node having ID 76 can be identified from calculating the closest node to 64+$2^3$, or 72.

A node can route messages (e.g., requests for access to resources) directly to a predecessor node, a successor node, any node in a set of neighborhood nodes, or any routing node. In some embodiments, nodes implement a numeric routing function to route messages. Thus, RouteNumerically(V, Msg) can be implemented at node X to deliver Msg to the node Y in the federation whose ID is numerically closest to V, and return node Y's ID to node X. For example, the node having ID 64 can implement RouteNumerically (243, Msg) to cause a message to be routed to the node having ID 250. However, since ID 250 is not a routing node for ID 64, ID 64 can route the message to ID 2 (the closest routing node to ID 243). The node having ID 2 can in turn implement RouteNumerically (243, Msg) to cause the message to be routed (directly or through further intermediary nodes) to the node having ID 250. Thus, it may be that a RouteNumerically function is recursively invoked with each invocation routing a message closer to the destination.

Using Replicated Queue State on a Ring Overlay Network

Figure 3A:
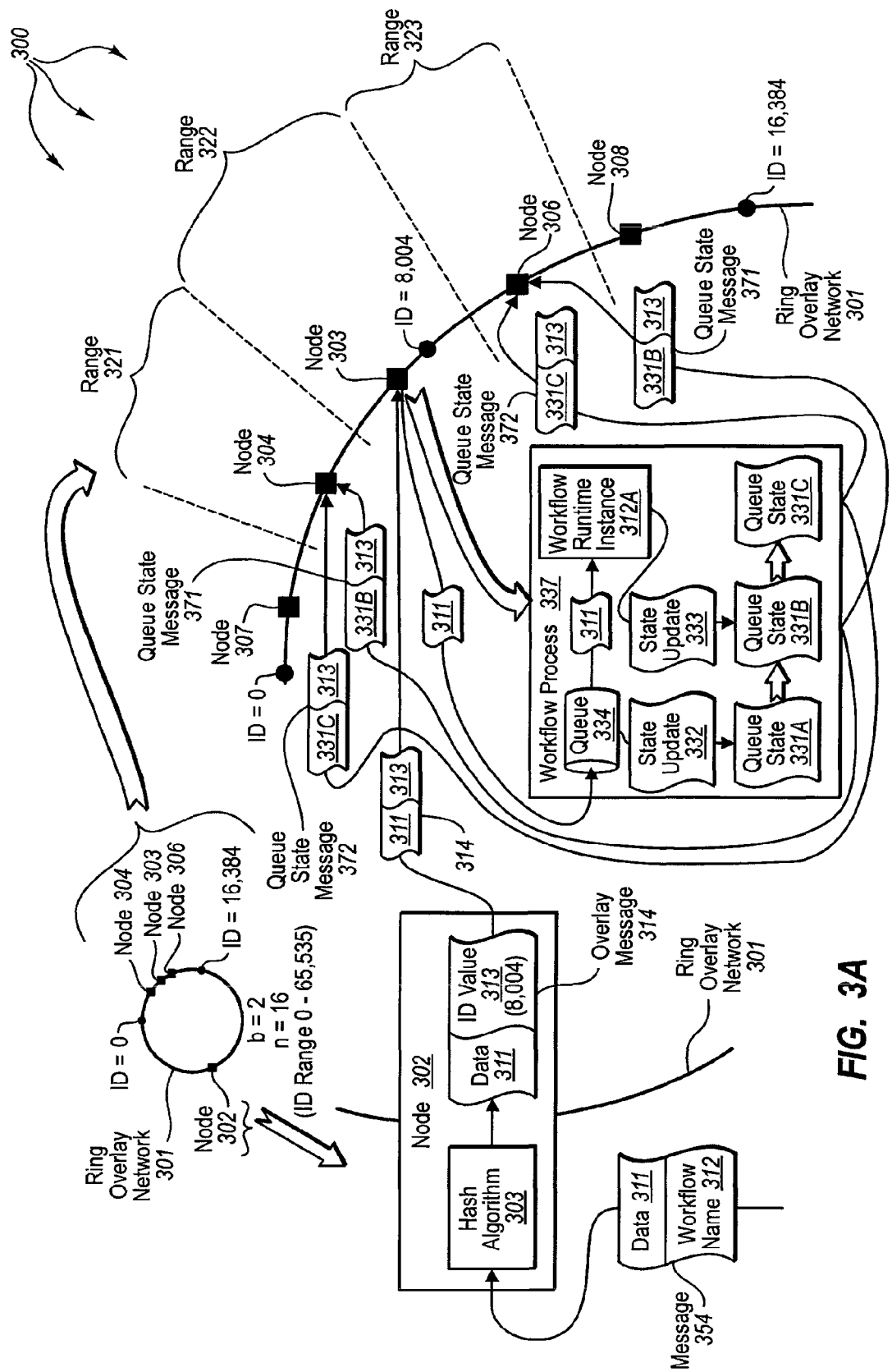
FIG. 3A illustrates an example computer architecture that facilitates replicating queue state on a ring overlay network.

FIG. 3A illustrates an example computer architecture 300 that facilitates replicating queue state on ring overlay network 301. The ID space of ring overlay network 301 is $2^{16}$, or 0-65,535. Ring overlay network 301 includes a plurality of nodes distributed across the ID space of ring overlay network 301, including at least nodes 302, 303, 304, 306, 307 and 309. Nodes in ring overlay network 301 can be assigned responsibility for sub ranges of ID values between 0 and 65,535. For example, nodes 304, 303, and 306 are assigned responsibility for ranges 321, 322, and 323 respectively.

Node 302 can function as one of one or more front end nodes into ring overlay network 301. Node 302 can receive messages from systems external to ring overlay network 301. Received messages can include data and the name of process provided by ring overlay network 301. For example, message 354 includes data 311 and workflow name 312. Message 354 represents that data 311 is to be sent to an instance of the workflow identified by workflow name 312.

Node 302 can utilize hash algorithm 303 to hash process names into ID values on ring overlay network 301. For example, node 302 can use hash algorithm 303 to hash workflow name 312 into ID value 313 (ID=8,004). Node 302 can then formulate overlay message 314 to include data 311 and ID value 313.

As depicted, ID=8,004, is within range 322. Thus, node 303 is assigned responsibility for processing messages sent to ID=8,004. Accordingly, routing protocols can be used to route overlay message 314 through one or more nodes on overlay ring network 301 and eventually to node 303.

Node 303 can receive overlay message 314. In response to receiving overlay message 314, node 303 (if appropriate, activates workflow process 337 and) sends data 311 to workflow process 337. Queue 334 and workflow runtime instance 312A are co-located in workflow process 337.

Data 311 can be temporarily queued in queue 334 before being dequeued to workflow runtime instance 313A (an instance of workflow name 312). Upon queueing data 111, the state of queue 334 changes. Process 2337 can reflect the state change in state update 332. Process 37 can apply state change state update 332 to queue state 331A (the current queue state for queue 334) to indicate that queue 334 has transitioned from queue state 331A to queue state 331B.

Node 303 replicates queue state 331B to one or more other nodes in ring overlay network 301. Node 303 can utilize appropriate routing protocols to send queue state messages containing queue state 331B to ID values assigned to the one or more other nodes. For example, node 303 queue state message 371 to ID values in ranges 321 and 323 to replicate queue state 331B (e.g., inserted and/or deleted messages) to nodes 304 and 306 respectively.

As other changes in the state of queue 334 occur, these state changes can also be replicated to other nodes in ring overlay network 301. For example, data 311 can be dequeued from queue 334 to process runtime instance 312A. Dequeuing data 311 from queue 334 can further change the queue state of queue 334. Process 337 can reflect the change in state in state change 333. Process 37 can apply state change 333 to queue state 331B to indicate that the state of queue 334 has transitioned to from queue state 331B to queue state 331C.

Process runtime instance 312A can process data 311 to partially complete a portion of work. Upon successfully processing of data 331, process 337 can replicate queue state 114C to other nodes in overlay network 101. Node 303 can utilize appropriate routing protocols to send queue state messages containing queue state 331C to ID values assigned to the one or more other nodes. For example, node 303 queue state message 372 to ID values in ranges 321 and 323 to replicate queue state 331C (e.g., inserted and/or deleted messages) to nodes 304 and 306 respectively. Upon receiving queue state message 182, nodes 132 and 133 can overwrite queue state 331B with queue state 331C. Nodes 304 and 306 can used ID value 113 (ID=8,004) to match queue state 331B with queue state 331C.

Figure 4:
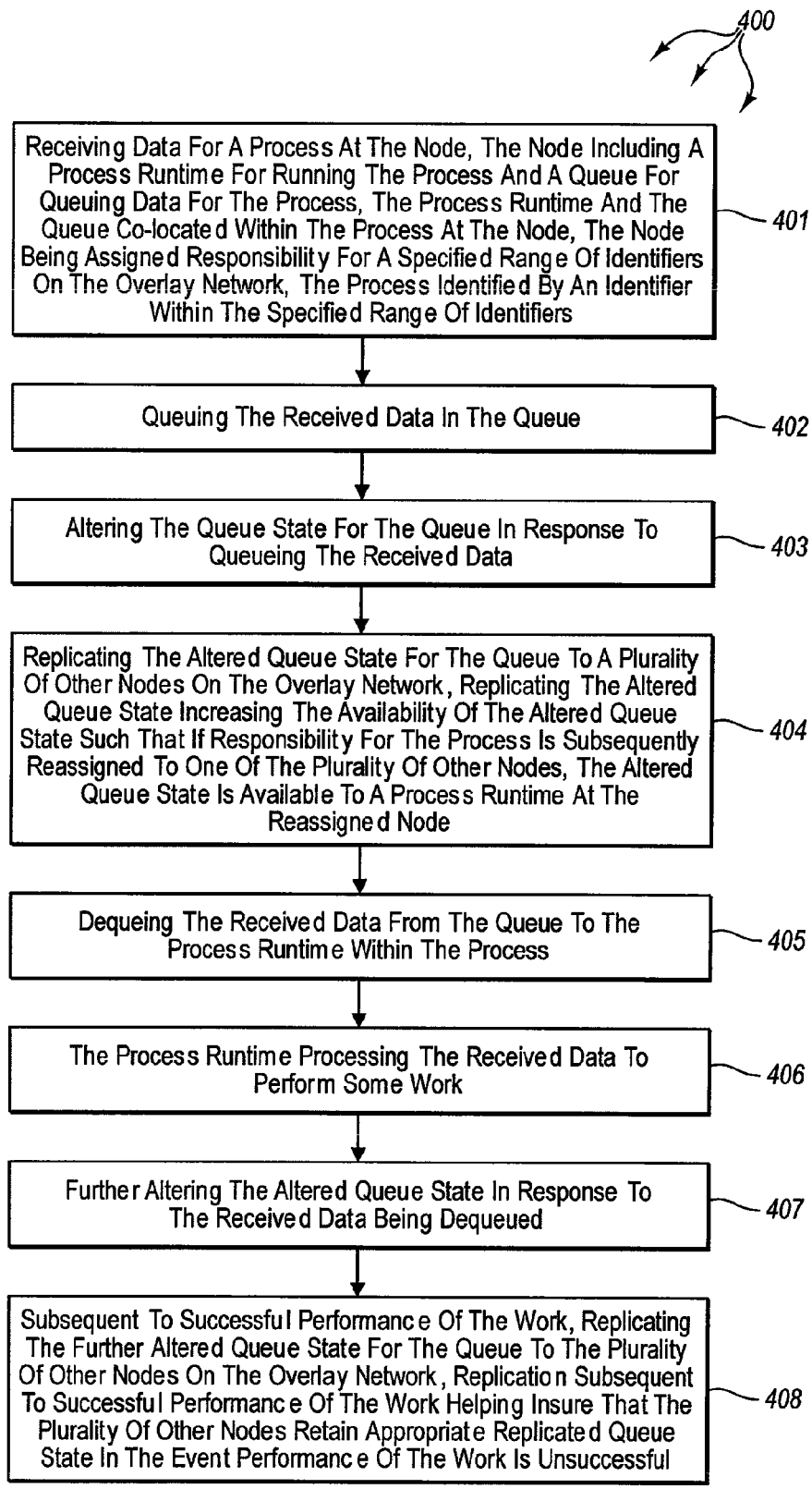
FIG. 4 illustrates a flow chart of an example method for replicating queue state within the overlay network.

FIG. 4 illustrates a flow chart of an example method 400 for replicating queue state within the overlay network. Method 400 will be described with respect to the components and data in FIG. 3A.

Method 400 includes an act of receiving data for a process at the node, the node including a process runtime for running the process and a queue for queuing data for the process, the process runtime and the queue co-located within the process at the node, the node being assigned responsibility for a specified range of identifiers on the overlay network, the process identified by an identifier within the specified range of identifiers (act 401). For example, node 303 can receive overlay message 314 including data 311 and ID value 313 (ID=8,004). Node 303 includes queue 334 and workflow runtime instance 312A co-located within process 337. Node 303 is responsible for range 322 and ID value 313 (ID=8,004) is within range 322.

Method 400 includes an act of queuing the received data in the queue (act 402). For example, node 303 can send data 311 to process 337. Process 337 can queue data 311 in queue 334. Method 400 includes an act of altering the queue state for the queue in response to queueing the received data (act 403). For example, process 337 can apply state update 332 to queue state 331A to transition queue state 331A to queue state 331B in response to queuing data 311.

Method 400 includes an act of replicating the altered queue state for the queue to a plurality of other nodes on the overlay network, replicating the altered queue state increasing the availability of the altered queue state such that if responsibility for the process is subsequently reassigned to one of the plurality of other nodes, the altered queue state is available to a process runtime at the reassigned node (act 404). For example, node 303 can send queue state messages 371 to replicate queue state 331B (e.g., inserted and/or deleted messages) to nodes 304 and 306. Replicating queue state 331B increases the availability of queue state 331B. Accordingly, if responsibility for workflow name 312 is reassigned to node 304 or node 306, queue state 331B is available to a workflow runtime instance at node 304 or node 306 respectively.

Method 400 includes an act of dequeing the received data from the queue to the process runtime within the process (act 405). For example, process 337 can dequeue data 311 from queue 334 to workflow runtime instance 312A within process 337. Method 400 includes an act of the process runtime processing the received data to perform some work (act 406). For example, workflow runtime process 312A can process data 311 to perform some work related to workflow name 312. Method 400 includes an act of further altering the queue state in response to the received data being dequeued (act 407). For example, process 337 can apply state update 333 to queue state 331B to transition queue state 331B to queue state 331C in response to dequeuing data 311.

Method 400 includes subsequent to successful performance of the work, an act of replicating the further altered queue state for the queue to the plurality of other nodes on the overlay network, replication subsequent to successful performance of the work helping insure that the plurality of other nodes retain appropriate replicated queue state in the event performance of the work is unsuccessful (act 408). For example, upon workflow runtime instance 312A successfully performing a work based on data 311, node 303 can send queue state messages 372 to replicate queue state 331C to nodes 304 and 306. Replicating queue state 331C after successful processing of data 311 helps insure that nodes 304 and 306 retain appropriate replicated queue state for queue 334. For example, if event workflow runtime instance 312A is unable to successfully process data 311 queue state 331C is not replicate and nodes 304 and 306 retain queue state 331B. Thus, if the configuration of nodes in ring overlay network changes, there is an increased likelihood of nodes 304 and 306 having appropriate queue state to continue a portion of work for workflow name 312.

As such, it may that responsibility for ID value 313 (ID=8,004) (and thus responsibility for workflow name 312) changes after workflow runtime instance 312A replicates queue state 331C. For example, when the node configuration in ring overlay network 301 changes, identifier assignment protocols can re-assign responsibility for different sub ranges of the ID range 0-65,535. For example, when a node joins overly network 301, portions of existing identifier ranges for one or more existing nodes can be re-assigned from the one or more existing nodes to the joining node. Likewise, when a node departs from ring overlay network 301, portions of the identifier range assigned to the leaving node can be re-assigned to one or more remaining nodes.

Figure 3B:
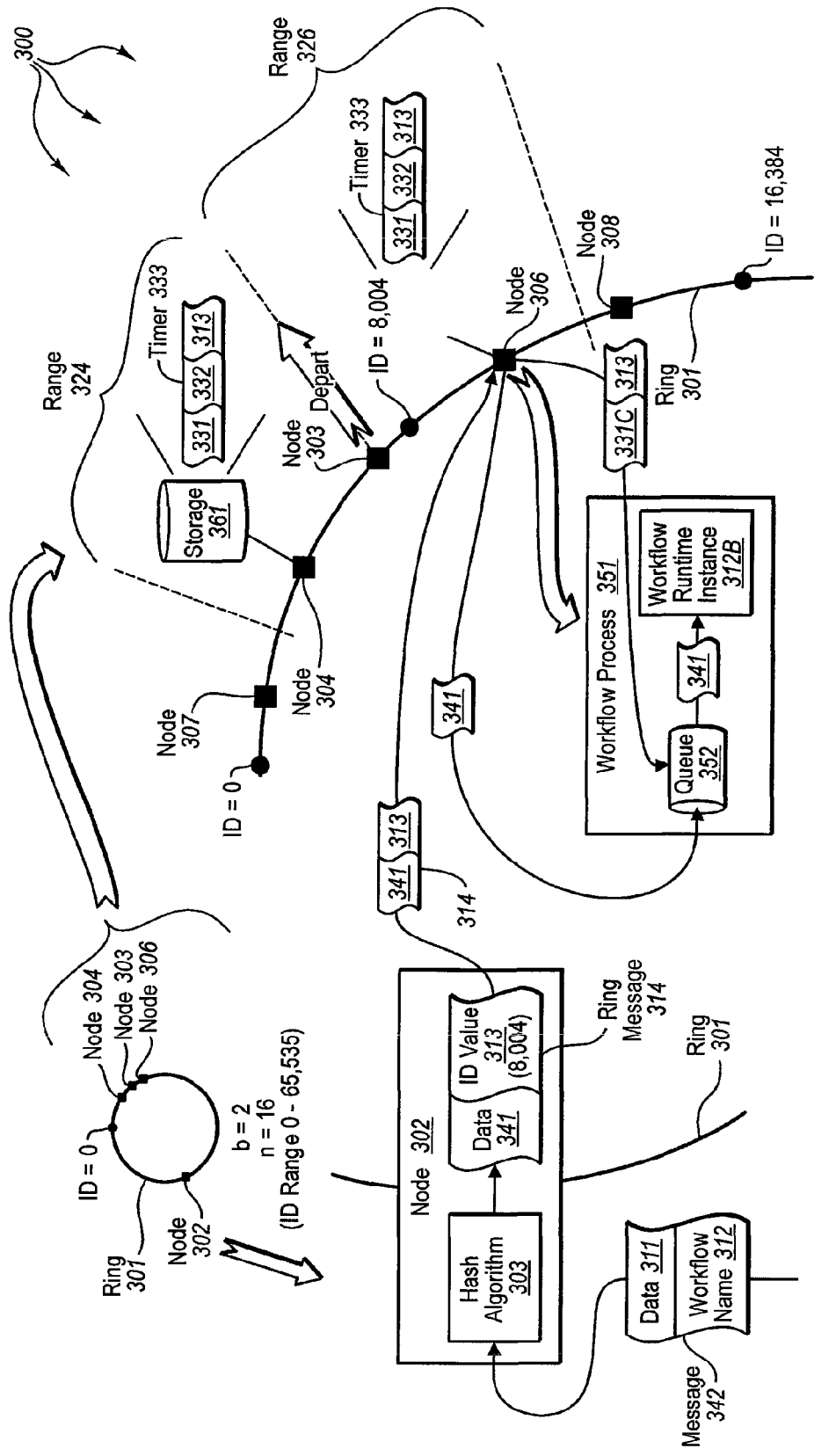
FIG. 3B illustrates an example computer architecture that facilitates assuming ownership of a process on a ring overlay network.

FIG. 3B illustrates example computer architecture 300 that facilitates assuming ownership of a process within ring overlay network 301. For example, if node 303 departs ring overlay network 301 (either in an orderly manner or due to a malfunction (crash, loss of power, etc.)), portions of identifier range 322 can be re-assigned to other remaining nodes, such as, for example, nodes 304 and 306. Referring now to FIG. 3B, node 303 departs ring overlay network 301. Nodes in overlay network 301 can receive an appropriate depart message indicating that node 303 has departed.

In response to the departure of node 303, identifier assignment protocols re-assign responsibility for range 322. Responsibility for range 322 is split between nodes 304 and 306. Thus, node 304 is assigned responsibility for part of range 322 and node 306 is assigned responsibility for part of range 322. For example, range 324 can include range 321+ part of range 322 and range 326 can include range 323 plus a part of range 322. As depicted in FIG. 3B, ID value 313 (ID=8,004) is in range 326 and is thus now the responsibility of node 306.

Node 306 can determine that it is (now) assigned responsibility for ID value 313 (ID=8,004). As such, node 306 can activate queue 352 and workflow runtime instance 312B (another instance of workflow name 312) within workflow process 351. Node 306 can then apply queue state 331C to cause queue 352 to transition to the last known state of queue 334. As such, node 306 configures workflow runtime instance 312B to process subsequent messages for workflow name 312 to continue a portion of work partially completed by workflow runtime instance 312A.

For example, node 306 can receive data 341 for workflow name 312. Node 306 can pass data 341 to process 337. Data 341 can temporarily queued in queue 352 before being dequeued to workflow runtime 312B. Workflow runtime 312B can process data 341 to continue a portion of work for workflow name 312.

Figure 5:
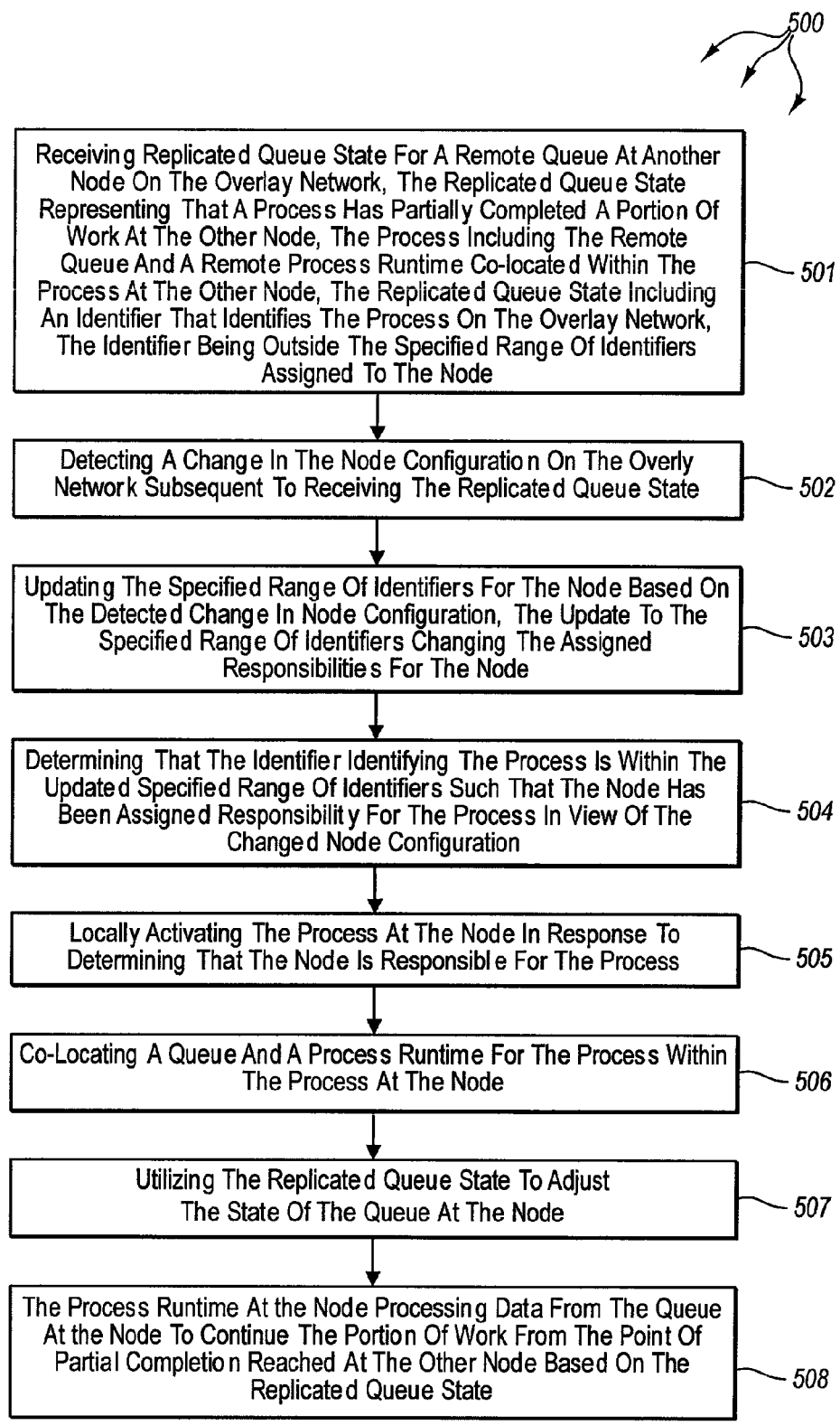
FIG. 5 illustrates a flow chart of an example method for assuming ownership of a process within an overlay network.

FIG. 5 illustrates a flow chart of an example method 500 for assuming ownership of a process within an overlay network. Method 500 will be described with respect to the components and data in FIGS. 3A and 3B.

Method 500 includes an act of receiving replicated queue state for a remote queue at another node on the overlay network, the replicated queue state representing that a process has partially completed a portion of work at the other node, the process including the remote queue and a remote process runtime co-located within the process at the other node, the replicated queue state including an identifier that identifies the process on the overlay network, the identifier being outside the specified range of identifiers assigned to the node (act 501). For example, node 306 can receive queue state message 372, including replicated queue state 331C (e.g., inserted and/or deleted messages) and ID value 313 (ID=8,004), from node 303. Replicated queue state 331C represents that process 337 has partially completed a portion of work at node 303. Process 337 includes co-located queue 334 and workflow runtime instance 312A. Upon receiving queue state message 372 at node 306, ID value 313 is outside of range 323.

Method 500 includes an act of detecting a change in the node configuration on the overly network subsequent to receiving the replicated queue state (act 502). For example, node 306 can detect that node 303 has departed ring overlay network 303.

Method 500 includes an act of updating the specified range of identifiers for the node based on the detected change in node configuration, the update to the specified range of identifiers changing the assigned responsibilities for the node (act 503). For example, range 323 can be updated to include a portion of range 322, resulting in range 326 (and including ID value 313 (ID=8,004). The ID values in range 326 differ from the ID values in range 322. As such, the assigned responsibilities for node 306 are changed.

Method 500 includes an act of determining that the identifier identifying the process is within the updated specified range of identifiers such that the node has been assigned responsibility for the process in view of the changed node configuration (act 504). For example, node 306 can determine that ID value 313 (ID=8,004) is within range 326. Accordingly, node 306 has been assigned responsibility for workflow name 312 in view of node 303 departing ring overly network 301.

Method 500 includes an act of locally activating the process at the node in response to determining that the node is responsible for the process (act 505). For example, node 306 can locally activate process 351 at node 306. Process 351 can be activated in response to determining that node 306 is responsible for workflow name 312. Method 500 includes an act of co-locating a queue and a process runtime for the locally activated process within the process at the node (act 506). For example, node 306 can co-locate queue 352 and workflow runtime instance 312B (another instance of workflow name 312) within process 351 at node 306

Method 500 includes an act of utilizing the replicated queue state to adjust the state of the queue at the node (act 507). For example, process 351 can utilize queue state 331C to adjust the state of queue 352 at node 306. Method 500 includes an act of the process runtime at the node processing data from the queue at the node to continue the portion of work from the point of partial completion reached at the other node based on the replicated queue state for (act 508). For example, node 306 can receive data 341 and forward data to process 351. Data 341 can temporarily queued in queue 352 before being dequeued to workflow runtime 312B. Workflow runtime 312B can process data 341 to continue a portion of work from the point of partial completion reached at node 304, based queue state 331C being used to appropriately adjust the state of queue 352.

Communication between nodes in an overlay network can occur in a variety of different ways. As previously described, routing protocols can be used to route messages between nodes in an overlay network. In some embodiments, messages are routed between nodes without routing consistency. In other embodiments, messages are routed between nodes with routing consistency.

Routing in Accordance with Cached Agreements

For example, in embodiments that use routing consistency, messages can be routed in accordance with cached routing agreements to facilitate routing consistency. Adjacent nodes of a ring (or other overlay network) can agree to a division of responsibility for a range of unoccupied identifiers between the adjacent nodes. An identifier can be unoccupied for any number of reasons. For example, an identifier may be unoccupied because the identifier is unassigned (i.e., the identifier that has not been assigned to a node). For assigned identifiers (i.e., identifiers that have been assigned to a node), an identifier may be unoccupied because the corresponding node has been deliberately shutdown or the node is for some reason, such as, for example, due to communication or node failures, otherwise unreachable.

Routing agreements between nodes can be established and cached prior to nodes being permitted to accept messages for and deliver messages for any of the unoccupied identifiers that are to be the responsibility of the adjacent nodes. Reference to a cached routing agreement significantly reduces any communication between (potentially) adjacent nodes that may otherwise occur to determine which node is responsible for a specific unoccupied identifier.

A cached routing agreement can divide a range of unoccupied identifiers in an arbitrary fashion, in accordance with configurable rules, or in accordance with a fixed methodology. In some embodiments, a range of identifiers between adjacent nodes on a ring is divided essentially in half. This reduces the likelihood of an unoccupied identifier being further from a node that is responsible for the unoccupied identifier.

When there is an even number of unoccupied identifiers between adjacent nodes, the midway point between the adjacent nodes is between unoccupied identifiers. Thus, responsibility for the unoccupied identifiers can be divided at the midway point between the adjacent nodes. Accordingly, each adjacent node can be assigned responsibility for an equal number of unoccupied identifiers.

On the other hand, when there is an odd number of unoccupied identifiers between adjacent nodes, the midway point between the adjacent nodes is at an unoccupied identifier. Thus, responsibility for the unoccupied identifiers can be divided at one side or the other of the unoccupied identifier that is the midway point. Accordingly, one adjacent node can be assigned responsibility for one more unoccupied identifier than the other adjacent node.

Figure 6A:
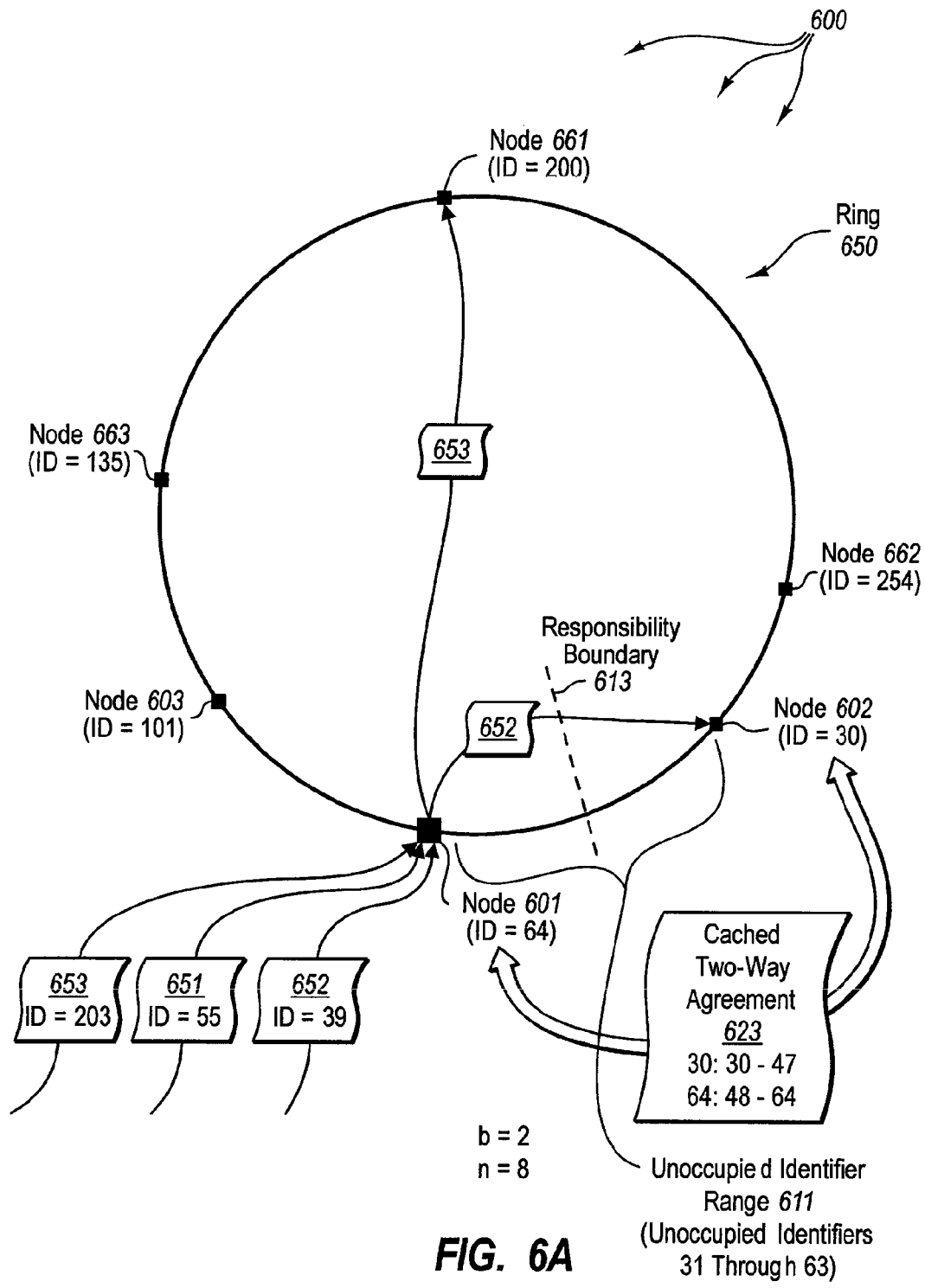
FIG. 6A illustrates an example ring architecture that facilitates routing a message in accordance with a cached two-way agreement.

Single two-way agreements: For example, referring now to FIG. 6A, FIG. 6A illustrates an example ring architecture 600 that facilitates routing a message in accordance with a cached two-way agreement between nodes. As depicted, various nodes (shown as squares on ring 650) including (but not limited to) nodes 601, 602, 603, 661, 662, and 663 are included on ring 650. Each node has a corresponding ID (shown in parenthesis) indicating its position on ring 650. For example, node 601 has ID=64 and node 602 has ID=30.

There are ranges of unoccupied identifiers between the depicted nodes. For example, unoccupied identifier range 611 represents unoccupied identifiers 31 through 63 between nodes 602 and 601.

As depicted, node 601 and 602 have established and cached two-way agreement 623. For example, through prior communication, nodes 601 and 602 can determine that there are no other nodes currently interspersed between ID=64 and ID=30. Thus, nodes 601 and 602 can further determine that they are adjacent to one another on ring 650. Accordingly, node 601 and 602 can divide responsibility for unoccupied identifier range 611 (i.e., unoccupied identifiers 31 through 63) such that node 602 is responsible for a portion of unoccupied identifier range 611 and node 601 is responsible for the remaining portion unoccupied identifier range 611. Each node is also responsible for its assigned ID. That is, node 602 is responsible for ID=30 and node 601 is responsible for ID=64.

Accordingly, as depicted by responsibility boundary 613 (between unoccupied identifier 47 and unoccupied identifier 48), node 602 (ID=30) is responsible for itself as well as unoccupied identifiers 31 through 47 and node 601 (ID=64) is responsible for itself as well as unoccupied identifiers 48 through 63. Although the midway point between nodes 601 and 602 is at unoccupied identifier 47, node 802 is assigned responsibility for unoccupied identifier 47 such that each unoccupied identifier is the responsibility of a single node. Thus, as previously described, when a responsibility boundary falls on an unoccupied identifier, one of the adjacent nodes can be assign the sole responsibility for the unoccupied identifier.

In some embodiments, a message is routed in accordance with a cached two-way agreement. A receiving node receives a message along with a destination identifier indicating a destination on the ring of nodes, the destination identifier located between the receiving node and one of the immediate neighbor nodes. For example, node 601 can receive message 651, indicated for delivery to ID=55. Alternately, node 601 can receive message 652, indicated for delivery to ID=39. Message 651 and 652 can be received from another node in ring 650 (intra-ring communication), from a node in another ring of ring architecture 600 (inter-ring communication), or through non-ring communication.

The receiving node refers to a cached two-way agreement between the receiving node and the immediate neighbor node to determine the next appropriate node that is to receive the message. The two-way agreement at least implies a division of responsibility for the identifier space between the receiving node and an immediate neighbor node. For example, node 601 can refer to cached two-way agreement 623 to determine the next appropriate node that is to process message 851. Since cached two-way agreement 623 indicates that node 801 (ID=64) is responsible for unoccupied identifier 55, node 601 determines that it is the appropriate node to process message 651. Likewise, node 601 can refer to cached two-way agreement 623 to determine the next appropriate node that is to process message 652. Since cached two-way agreement 623 indicates that node 602 (ID=30) is responsible for unoccupied identifier 39, node 601 determines that node 602 is the next appropriate node that is to process message 652.

The message is sent to the next appropriate component based on the determination of the next appropriate node. For example, node 601 can provide message 651 to its resource handler instance corresponding to unoccupied identifier 55, since cached two-way agreement 623 indicates that node 601 is responsible for unoccupied identifier 55. Alternately, node 601 can provide message 652 to node 602, since cached two-way agreement 623 indicates that node 602 is responsible for unoccupied identifier 39. Subsequently, node 602 can provide message 652 to its resource handler instance corresponding to unoccupied identifier 39.

When an identifier is not included in a cached two-way agreement, a node can refer to a routing table (e.g., as depicted in FIG. 2) to make progress towards a destination. For example, node 601 can send message 653, indicated for delivery to ID=203, to node 661 (ID=200). Node 661 can then refer to any cached two-way agreements with its adjacent nodes to determine the node that is responsible for identifier 203.

Figure 6B:
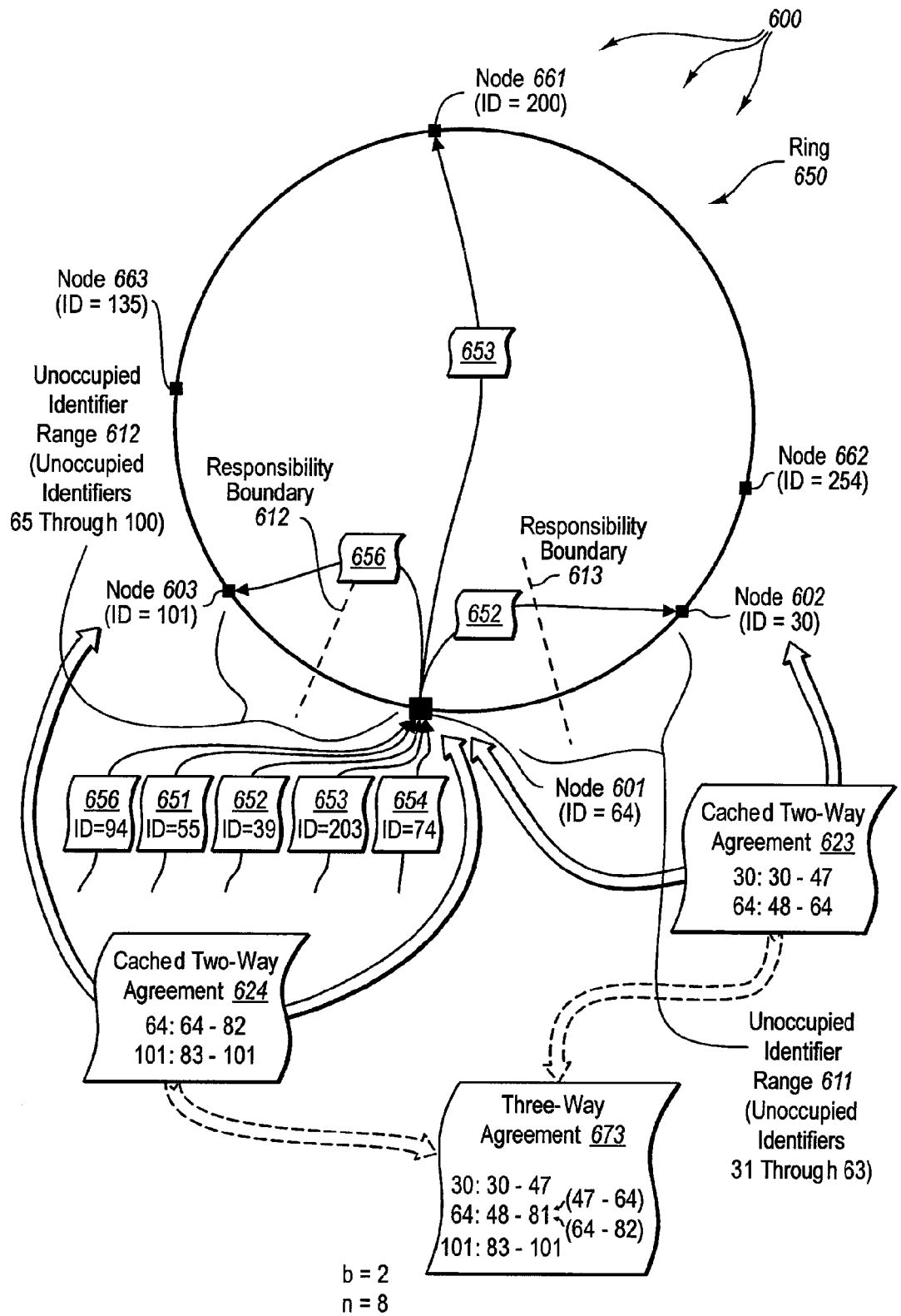
FIG. 6B illustrates an example ring architecture that facilitates routing a message in accordance with multiple cached two-way agreements.

Multiple two-way agreements: In some embodiments, multiple two-way agreements can, from the perspective of a given node, essentially represent a three-way agreement between the given node, the given node's immediate predecessor node, and the given node's immediate successor node. FIG. 6B illustrates the example ring architecture 600 that facilitates routing a message in accordance with multiple cached two-way agreements.

As previously described, nodes 601 and 602 can establish cached two-way agreement 623. Similarly, nodes 601 and 603 can establish cached-two way agreement 624 to divide responsibility for unoccupied identifier range 612 (i.e., unoccupied identifiers 65 through 101). Thus, through prior communication, nodes 601 and 603 can determine that there are no other nodes currently interspersed between ID=65 and ID=101. Thus, nodes 601 and 603 can further determine that they are adjacent to one another on ring 650. Accordingly, nodes 601 and 603 can divide unoccupied identifier range 612 such that node 602 is responsible for a portion of unoccupied identifier range 612 and node 601 is responsible for the remaining portion of unoccupied identifier range 612. Accordingly, as depicted within two-way agreement 624, node 601 (ID=64) is responsible for itself as well as unoccupied identifiers 65 through 82 and node 602 (ID=101) is responsible for itself as well as unoccupied identifiers range 83 through 100.

From the perspective of node 601, the combination of cached two-way agreement 623 and cached two-way agreement 624 essentially represents three-way agreement 673. That is, node 601 is responsible for a portion of identifier space between node 601 and node 602 and is responsible for a portion of identifier space between node 601 and node 603. The parenthetical ranges of identifiers indicate the ranges of responsibility (i.e., 47 through 64 and 64 through 82) form the cached-two way agreements 623 and 624 on either side of node 601.

In some embodiments, a message is routed in accordance with multiple cached two-way agreements. A receiving node receives a message along with a destination identifier indicating a destination on the ring of nodes. For example, node 601 can receive any of messages 651, 652, 653, 2254, and 656 indicated for delivery to ID=55, ID=39, ID=203, ID=74, and ID=94 respectively. Messages 651, 652, 653, 654, and 656 can be received from another node in ring 650 (intra-ring communication) or from a node in another ring of ring architecture 600 (inter-ring communication), or through non-ring communication.

Node 601 can refer to cached two-way agreements 623 and 624 to determine the next appropriate node that is to receive any of messages 651, 652, 653, 654, and 656. Thus, cached two-way agreements 623 and 624 at least imply a division of responsibility for the identifier space between the node 601 and node 602 and node 601 and node 603 respectively.

Since cached two-way agreement 623 indicates that node 602 (ID=30) is responsible for unoccupied identifier 39, node 601 determines that node 602 is the next appropriate node that is to process message 652. Since cached two-way agreement 623 indicates that node 601 (ID=64) is responsible for unoccupied identifier 55, node 601 determines that it is the appropriate node to process message 652. Since cached two-way agreement 624 indicates that node 601 (ID=64) is responsible for unoccupied identifier 74, node 601 determines that it is the appropriate node to process message 654. Since cached two-way agreement 624 indicates that node 603 (ID=101) is responsible for unoccupied identifier 94, node 601 determines that node 603 is the next appropriate node that is to process message 654.

The message is sent to the next appropriate component based on the determination of the next appropriate node. For example, node 601 can send messages 651, 652, 653, 654, and 656 to the next appropriate component on ring 650 based on the determination of the next appropriate node that is to process messages 651, 652, 653, 654, and 656.

For example, node 601 can provide message 652 to node 602, since cached two-way agreement 623 indicates that node 602 is responsible for unoccupied identifier 39. Subsequently, node 602 can provide message 652 to its resource handler instance corresponding to unoccupied identifier 39. Node 601 can provide message 651 to its resource handler instance corresponding to unoccupied identifier 55, since cached two-way agreement 623 indicates that node 601 is responsible for unoccupied identifier 55. Node 601 can provide message 654 to its resource handler instance corresponding to unoccupied identifier 74, since cached two-way agreement 624 indicates that node 601 is responsible for unoccupied identifier 74. Node 601 can provide message 656 to node 603, since cached two-way agreement 624 indicates that node 603 is responsible for unoccupied identifier 94. Subsequently, node 603 can provide message 656 to its resource handler instance corresponding to unoccupied identifier 94.

When an identifier is not included in a cached either of multiple cached two-way agreements, a node can refer to a routing table (e.g., as depicted in FIG. 2) to make progress towards a destination. For example, node 601 can send message 656, indicated for delivery to ID=203, to node 661 (ID=200). Node 661 can then refer to any cached two-way agreements with its predecessor node and/or its successor node to determine the next appropriate component that is to receive message 653.

Formulating Cached Agreements

Rings (as well as other types of overlay networks) can be reconfigured from time to time, such as, for example, when a new node joins or when an existing node departs (e.g., through graceful removal, as a result of node monitoring, through reference to an arbitrator, etc.). When a node detects that the configuration of a ring has changed, the node can reformulate cached routing agreements with any adjacent nodes. During agreement reformulation, the node can queue any received messages, expect those for formulating the agreement. After formulation of the agreement is complete, the node can then process the messages in accordance with the agreement.

Reconfiguration of a ring (or other overlay network) can cause multiple routing agreements to be reformulated. For example, when a node departs, adjacent nodes to the departing node can formulate an agreement for the range of unoccupied identifiers that were previously the responsibility of the departing node (thus potentially gaining responsibility for additional unoccupied identifiers). This reformulation joins responsibility for a portion of the range of unoccupied identifiers from the departing node with the range of unoccupied identifiers for each adjacent node. That is, each adjacent node may gain responsibility for a portion of the departing node's range of unoccupied identifiers and the departing node's identifier.

Figure 7A:
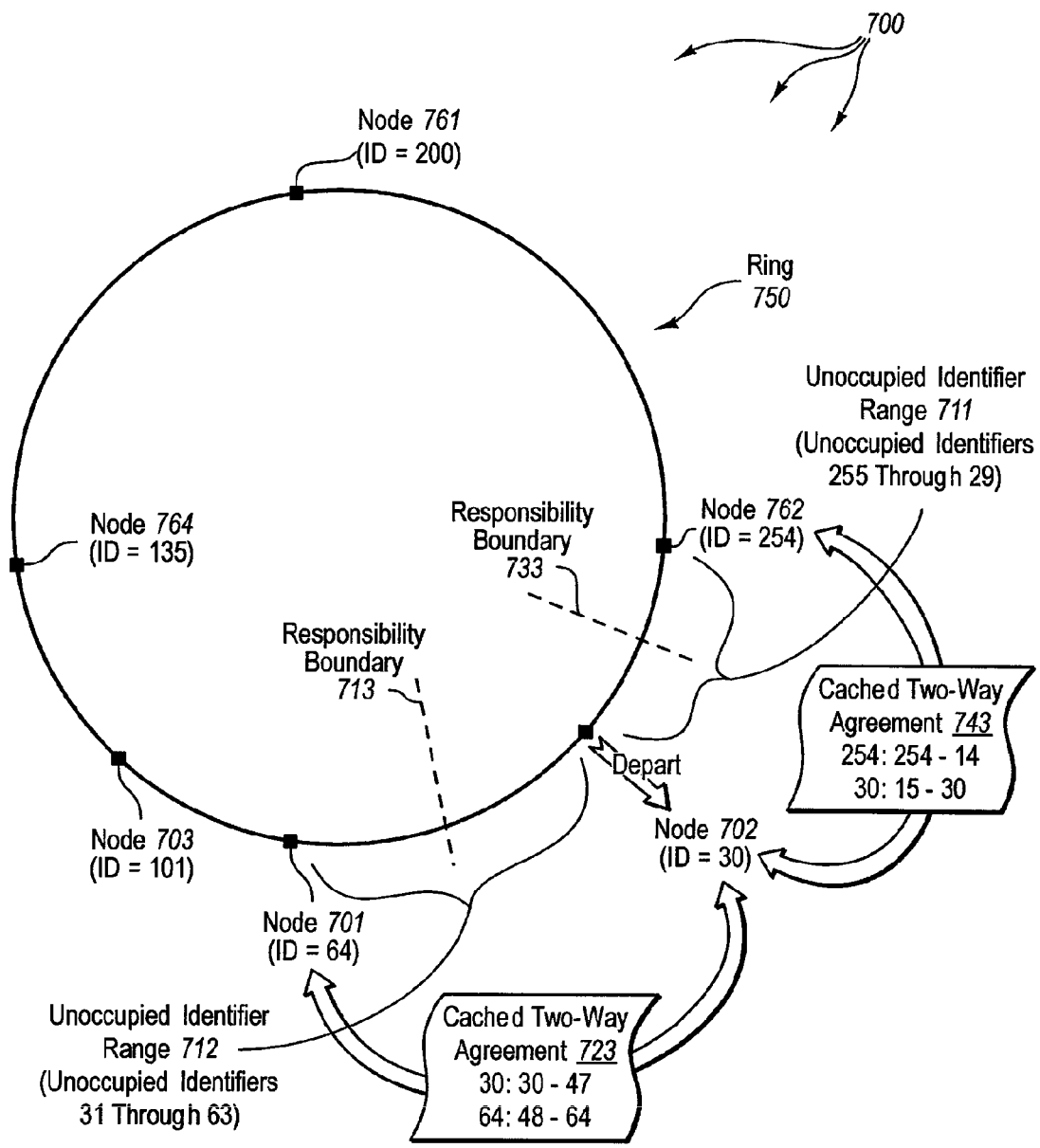
FIGS. 7A through 7D illustrate an example ring architecture that facilitates formulating a cached two-way agreement.

FIGS. 7A through 7D illustrate an example ring architecture 700 that facilitates formulating a cached two-way agreement. As depicted in FIG. 7A, nodes 701 and 702 have formulated cached two-way agreement 723 dividing responsibility for unoccupied identifier range 712 (i.e., unoccupied identifiers 31 through 63) at responsibility boundary 713 (between unoccupied identifier 47 and unoccupied identifier 48). Similarly, nodes 702 and 762 have formulated cached two-way agreement 743 dividing responsibility for unoccupied identifier range 711 (i.e., unoccupied identifiers 255 through 29) at responsibility boundary 733 (between unoccupied identifiers 14 and 15).

Figure 7B:
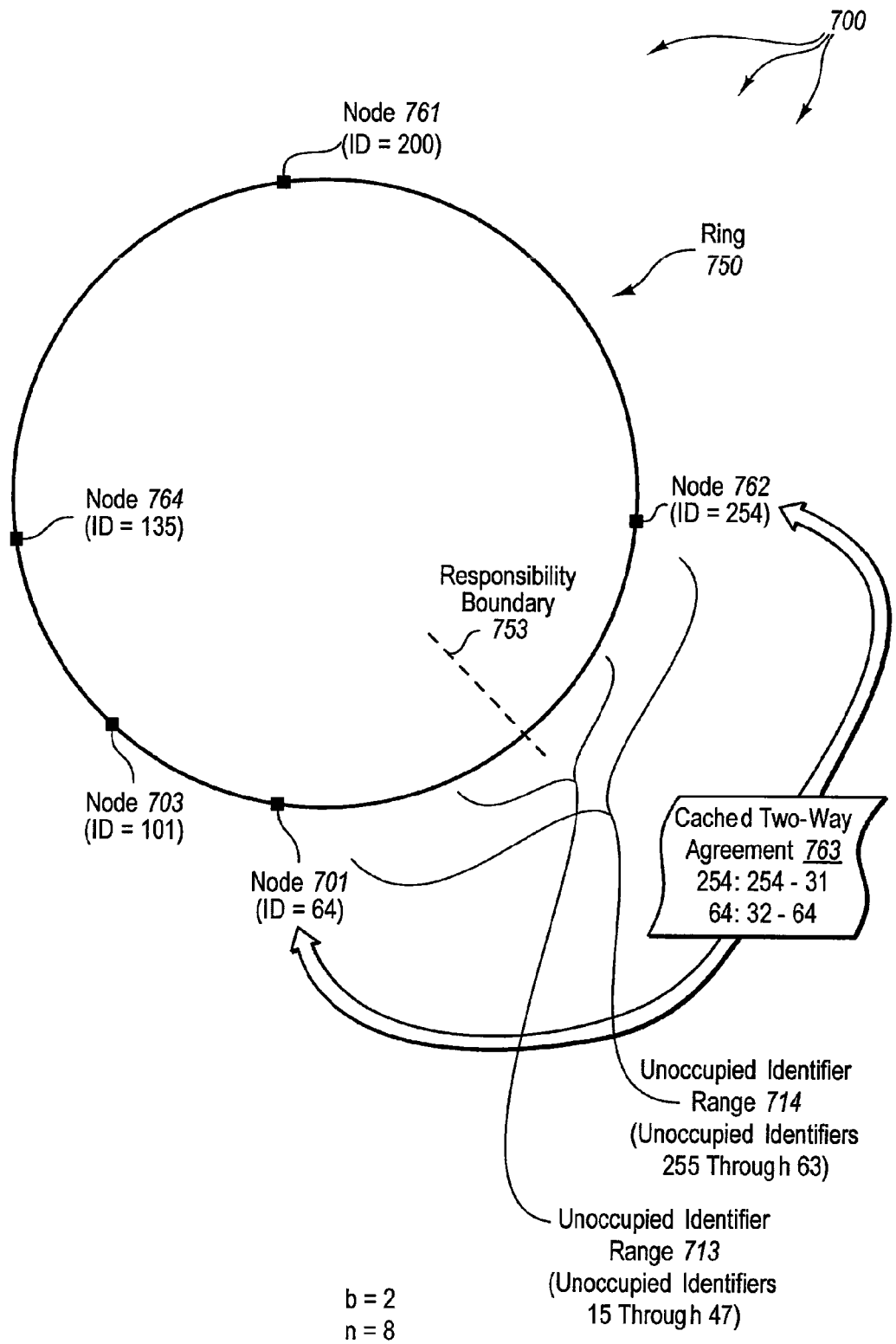

At some time subsequent to the formulation of cached two-way agreements 723 and 743, node 702 can leave ring 750 (e.g., through graceful removal, as a result of node monitoring, based on instructions from an arbitrator, etc.). Referring now to FIG. 7B, subsequent to node 702 leaving ring 750 there is no node responsible for the unoccupied identifiers that were previously the responsibility of node 702. Unoccupied identifier range 713 (unoccupied identifiers 15 through 47, including now unoccupied identifier 30) represents the range of unoccupied identifiers that node 702 was responsible for prior to departing ring 750.

In response to node 702 leaving ring 750, nodes 701 and 762 attempt to identify new immediate neighbor nodes. Node 762 attempts to identify a new immediate successor node (i.e., an immediate neighbor node in the same direction as node 702 relative to node 762). Node 701 attempts to identify a new immediate predecessor node (i.e., an immediate neighbor in the same direction as node 702 relative to node 701). In FIG. 7B, node 762 identifies node 701 as its new immediate successor and node 701 identifies node 762 as its new immediate predecessor.

Upon identifying new immediate neighbor nodes, nodes 762 and 701 formulate cached two-way agreement 763 to that divides responsibility for unoccupied identifier range 714 (unoccupied identifiers 255 through 63, including now unoccupied identifier 30). Unoccupied identified range 714 includes unoccupied identifier range 713, which was previously the responsibility of node 702. Thus, portions of unoccupied identifier range 713 can become the responsibility of either node 762 or node 701, after node 702 departs ring 750.

Accordingly, as depicted by responsibility boundary 753 (between unoccupied identifier 31 and unoccupied identifier 32), node 762 (ID=254) and node 701 (ID=30) formulate cached two-way agreement 763. In accordance with cached two-way agreement 763, node 762 (ID=254) is responsible for itself as well as unoccupied identifiers 255 through 31 and node 701 (ID=64) is responsible for itself as well as identifier range 32 through 63. Although the midway point between nodes 701 and 702 is at unoccupied identifier 31, node 762 is assigned responsibility for unoccupied identifier 31 such that each unoccupied identifier is the responsibility of a single node.

During time between the departure of node 702 and formulation of cached two-way agreement 763, nodes 701 and 762 do not process messages indicated for delivery to identifiers in the range between 255 and 63. Instead, nodes 701 and 762 queue any messages, expect those for formulating cached two-way agreement 763. After formulation of the cached two-way agreement 763 is complete, nodes 701 and 762 can then process the messages in accordance with cached two-way agreement 763.

When a new node joins a ring between two existing nodes, each existing node can formulate a routing agreement with the new node (and thus potentially giving up responsibility for a portion of unoccupied identifiers). This formulation can essentially split a range of unoccupied identifiers an existing node is responsible for between the joining node and the existing node. That is, each existing node potentially gives up responsibility for a portion of the existing node's unoccupied identifiers to the joining node.

Figure 7C:
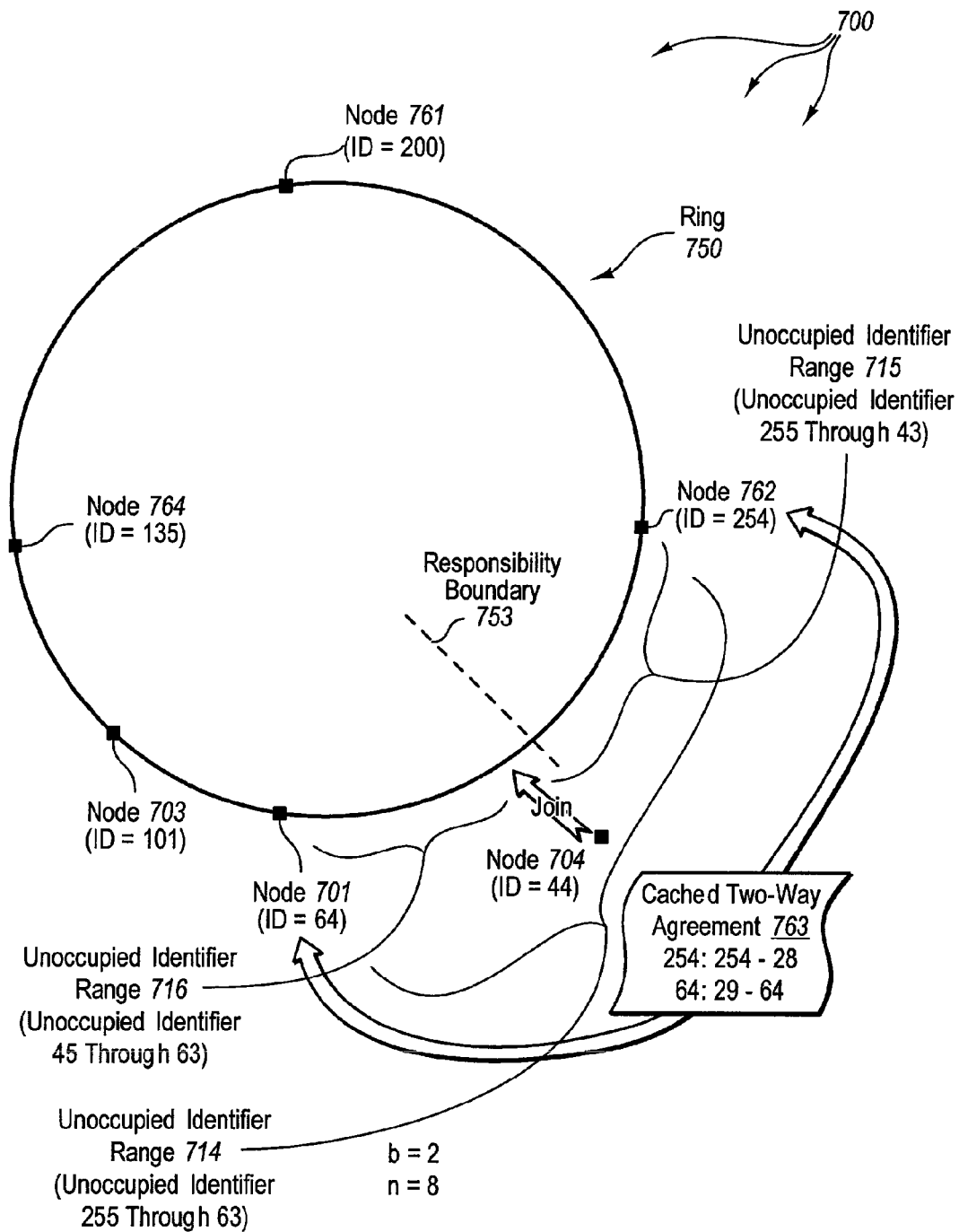

Referring now to FIG. 7C, at some time subsequent to the formulation of cached two-way agreement 763, node 704 (ID=44) can join ring 750. Subsequent to node 704 joining ring 750, node 762 can detect node 704 as its immediate successor. Likewise, node 701 can detect node 704 as its immediate predecessor. In response to each of the detections, unoccupied identifier range 714 is essentially split into unoccupied identifier range 715 (unoccupied identifiers 255 through 43) and unoccupied identifier range 716 (unoccupied identifiers 45 through 63). New cached-two way agreements can then be formulated to divide responsibility for unoccupied identifier ranges 715 and 716.

Figure 7D:
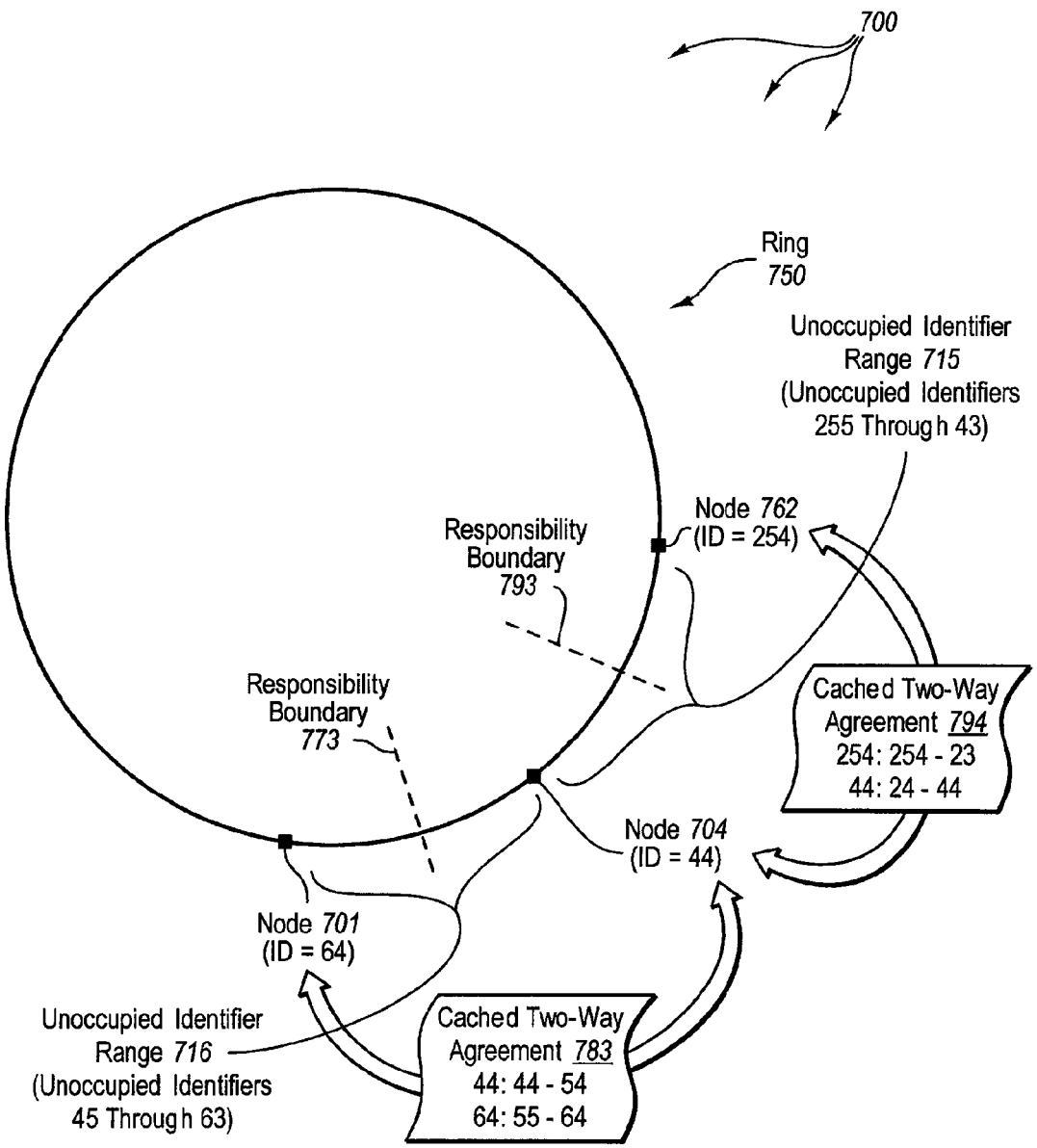

Referring now to FIG. 7D, upon identifying node 704 as a new immediate successor node, nodes 762 and 704 formulate cached two-way agreement 794 to that divides responsibility for unoccupied identifier range 715 (unoccupied identifiers 255 through 43). Unoccupied identified range 715 includes portions of unoccupied identifier range 714, which were previously the responsibility of node 762 and in this case some of which were previously the responsibility of node 701. Thus, portions of unoccupied identifier range 714 that were the responsibility of either node 762 or node 701, can become the responsibility of node 704 when node 704 joins ring 750.

Accordingly, as depicted by responsibility boundary 793 (between unoccupied identifier 9 and unoccupied identifier 24), node 962 (ID=254) and node 704 (ID=44) formulate cached two-way agreement 794. In accordance with cached two-way agreement 794, node 762 (ID=254) is responsible for itself as well as unoccupied identifiers 255 through 9 and node 704 (ID=44) is responsible for itself as well as identifier range 24 through 43. Although the midway point between nodes 701 and 702 is at unoccupied identifier 9, node 762 is assigned responsibility for unoccupied identifier 9 such that each unoccupied identifier is the responsibility of a single node.

Similarly, upon identifying node 704 as a new immediate predecessor node, nodes 701 and 704 formulate cached two-way agreement 783 that divides responsibility for unoccupied identifier range 716 (unoccupied identifiers 45 through 64). Unoccupied identified range 716 includes portions of unoccupied identifier range 714, which were previously the responsibility of node 701. Thus, portions of unoccupied identifier range 714, which were the responsibility of node 901, can become the responsibility of node 704 when node 704 joins ring 750.

Accordingly, as depicted by responsibility boundary 773 (between unoccupied identifier 54 and unoccupied identifier 55), node 704 (ID=44) and node 701 (ID=64) formulate cached two-way agreement 783. In accordance with cached two-way agreement 783, node 704 (ID=44) is responsible for itself as well as unoccupied identifiers 45 through 54 and node 701 (ID=64) is responsible for itself as well as identifier range 55 through 63. Although the midway point between nodes 701 and 702 is at unoccupied identifier 54, node 704 is assigned responsibility for unoccupied identifier 54 such that each unoccupied identifier is the responsibility of a single node.

During time between the joining of node 704 and formulation of cached two-way agreement 794, nodes 762 and 704 do not process messages indicated for delivery to identifiers in the range between 255 and 43. Instead, nodes 762 and 704 queue any messages, expect those for formulating cached two-way agreement 794. After formulation of the cached two-way agreement 794 is complete, nodes 762 and 704 can then process the messages in accordance with cached two-way agreement 794.

Similarly, during time between the joining of node 704 and formulation of cached two-way agreement 783, nodes 704 and 701 do not process messages indicated for delivery to identifiers in the range between 45 and 63. Instead, nodes 704 and 701 queue any messages, expect those for formulating cached two-way agreement 783. After formulation of the cached two-way agreement 783 is complete, nodes 704 and 701 can then process the messages in accordance with cached two-way agreement 783.

From the perspective of node 704, the combination of cached two-way agreement 794 and cached two-way agreement 783 can essentially represent a corresponding three-way agreement (not shown) between node 704, node 762, and 701. From the perspective of node 704, the corresponding represented three-way agreement defines responsibility for (assigned and unoccupied) identifiers from and including ID=254 to and including ID=64.

In some embodiments modes perform a method for joining a two-way agreement. A current node accesses an indication that the configuration of the ring of nodes has changed, the indication indicative of a need to formulate a two-way agreement dividing responsibility for at least unoccupied identifiers on the ring between the current node and the immediate neighbor node. For example, referring to FIGS. 7A and 7B, node 701 and/or node 762 can access an indication, for example, from node 702, through monitoring of node 702, or from an arbitrator, that node 702 departed ring 750. The indication of node 702 departing ring 750 indicates to node 701 and/or node 762 a need to formulate a two-way agreement dividing responsibility for unoccupied identifier range 714 (unoccupied identifiers 255 through 63).

Alternately, referring to FIGS. 7C and 7D, node 701 can access an indication (e.g., sent as part of the join process of node 704) that node 704 has joined ring 750. The indication of node 704 joining ring 750 indicates to node 701 a need to formulate a two-way agreement dividing responsibility for unoccupied identifier range 716 (unoccupied identifiers 45 through 63). Similarly, node 762 can access an indication (e.g., sent as part of the join process of node 704) that node 704 has joined ring 750. The indication of node 704 joining ring 750 indicates to node 762 a need to formulate a two-way agreement dividing responsibility for unoccupied identifier range 715 (unoccupied identifiers 255 through 43).

The current node and the immediate neighbor node agree to a responsibility boundary between the current node and the immediate neighbor node that is to divide responsibility for the unoccupied identifiers between the current node and the immediate neighbor node. Unoccupied identifiers between the current node and the responsibility boundary are the responsibility of the current node and unoccupied identifiers between the responsibility boundary and the immediate neighbor node are the responsibility of the immediate neighbor node.

For example, referring to FIG. 7B node 701 and node 762 can agree to responsibility boundary 753, which is essentially between unoccupied identifiers 31 and 32. Thus, unoccupied identifiers between node 901 and responsibility boundary 753 (i.e., unoccupied identifiers 32 through 63) are the responsibility of node 701. Likewise, unoccupied identifiers between responsibility boundary 753 and node 762 (i.e., unoccupied identifiers 255 through 31) are the responsibility of node 762.

Referring to FIG. 7D, node 701 and node 704 can agree to responsibility boundary 773, which is essentially between unoccupied identifiers 54 and 55. Thus, unoccupied identifiers between node 701 and responsibility boundary 773 (i.e., identifiers 55 through 63) are the responsibility of node 701. Likewise, unoccupied identifiers between responsibility boundary 773 and node 704 (i.e., unoccupied identifiers 45 through 54) are the responsibility of node 904.

Still referring to FIG. 7D, node 704 and node 762 can agree to responsibility boundary 793, which is essentially between unoccupied identifiers 9 and 24. Thus, identifiers between node 704 and responsibility boundary 793 (i.e., unoccupied identifiers 24 through 43) are the responsibility of node 704. Likewise, unoccupied identifiers between responsibility boundary 793 and node 762 (i.e., unoccupied identifiers 255 through 9) are the responsibility of node 762.

Node Monitoring

In embodiments that use routing consistency, node monitoring can also be used to facilitate routing consistency. For example, to detect changes in the configuration of nodes in a ring or other overlay network, nodes an monitor one another.

Figure 8A:
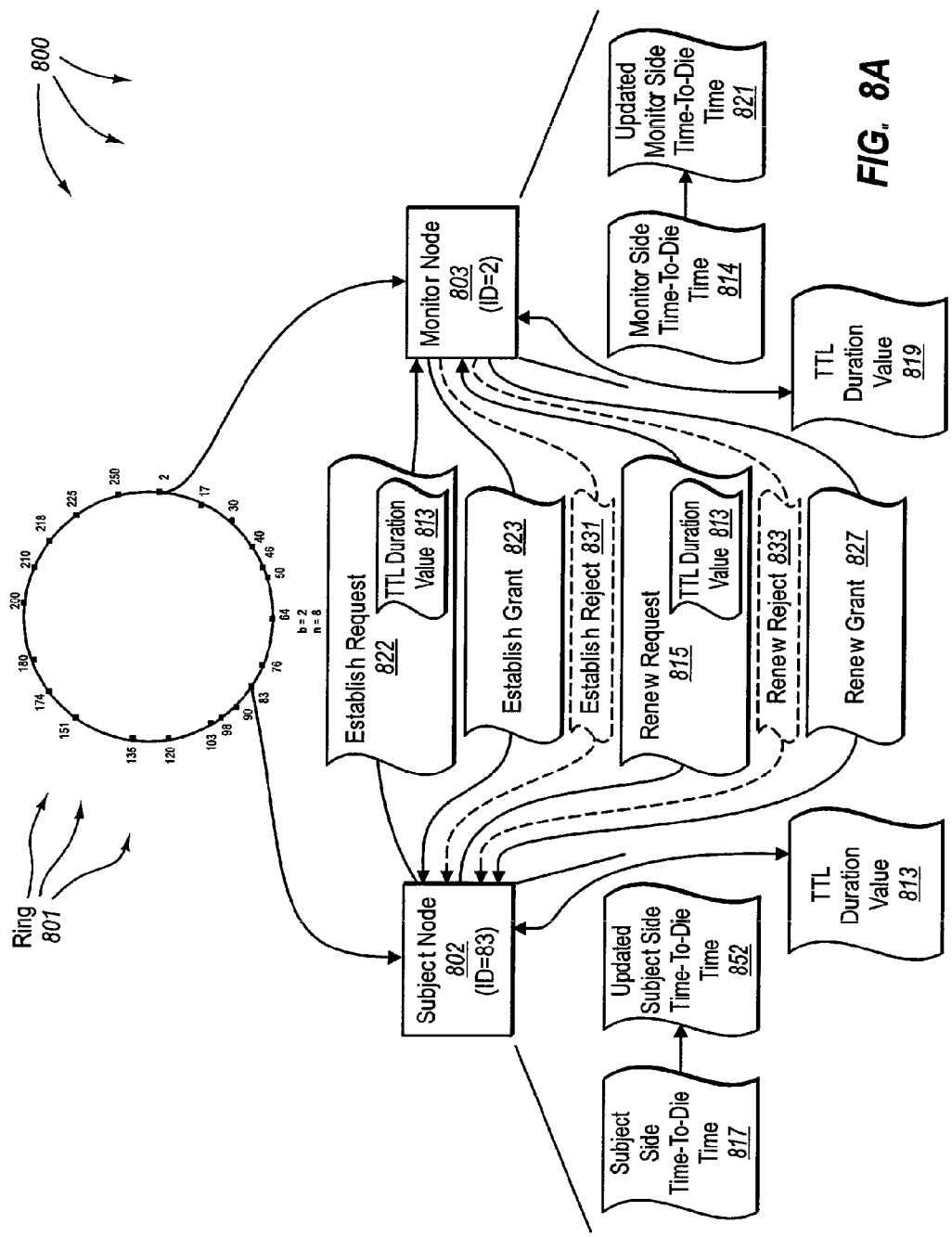
FIG. 8A illustrates an example ring architecture that facilitates one node monitoring another (e.g., a subject) node.

One-Way Monitoring: FIG. 8A illustrates an example ring architecture 800 that facilitates one node monitoring another node. As depicted, ring architecture includes at least ring 801 (and any number of other higher and/or lower level rings (not shown)). Ring 801 can be configured similar to ring 206 of FIG. 2. However, monitoring can occur on any ring of nodes or other overlay network.

FIG. 8A depicts an expanded view of subject node 802 (having ID=83) and monitor node 803 (having ID=2). In the depicted embodiment, monitor node 803 is to monitor subject node 802. However, any node on ring 801 can be configured to monitor any other node on ring 801.

To facilitate one-way monitoring, a subject node generates a subject side time-to-live duration value for use in monitoring of the subject node. For example, subject node 802 can establish time-to-live (TTL) duration value 813. TTL duration value 813 indicates a duration for which subject node 802 can assume a monitoring relationship with monitor node 803 is active. The subject can send an establish request to the monitor node, the establish request indicative of the subject node requesting that the monitor node monitor the subject node, the establish request including the subject side time-to-live duration value. For example, subject node 802 can send establish request 822, including TTL value duration 813, to monitor node 803.

The subject node establishes an existing subject side time-to-die time based on the subject side time-to-live duration value and the time the establish request was sent, wherein the subject node clock reaching the existing subject side time-to-die time, prior to receiving an establish grant from the monitor node, is an indication of the subject node having to transition to a failure state. For example, subject node 802 can establish subject side time-to-die time 817 based on TTL duration value 813 and the time the establish request 822 was sent to monitor node 803. Subject side time-to-die time 817 can be a time relative to subject node 802. If a clock of subject node 802 reaches subject side time-to-die time 817, prior to receiving an establish grant form monitor node 803, subject node 802 is to transition to a failure state. In some embodiments, when a clock of subject node 802 reaches subject side time-to-die time 817, prior to receiving an establish grant from monitor node 803, a failure state is caused. In other embodiments, other activities occur to transition subject node 802 into a failure state.

The monitor node receives the establish request from the subject node, the establish request indicative of the subject node requesting that the monitor node monitor the subject node, the establish request including at least the subject side time-to-live duration value, the subject side time-to-live duration value used to determine a subject side time-to-die time at the subject node, wherein the subject node clock reaching the subject side time-to-die time, prior to receiving an establish grant from the monitor node, is an indication of the subject node having to transition to a failure state. For example, monitor node 803 can receive establish request 822, including TTL duration value 813, from subject node 802. TTL duration value 813 having been used at subject node 802 to establish subject side time-to-die time 817.

The monitor node derives a monitor side time-to-live duration value from the subject side time-to-live duration value. For example, monitor node 803 can use TTL value duration 813 to derive TTL duration value 819. In some embodiments, monitor node 803 copies TTL duration value 813 to derive TTL duration value 819. In these embodiments, TTL value duration 813 and TTL value duration 819 are equal. In other embodiments, monitor node 803 modifies TTL duration value 813 to derive TTL duration value 77. In these other embodiments TTL duration value 713 and TTL duration value 819 differ. For example, monitor node 803 can increase the value of TTL duration value 813 to derive TTL duration value 819 such that TTL duration value 819 is larger than TTL duration value 813.

The monitor node establishes a monitor side time-to-die time based on the monitor side time-to-live duration value and the time the establish request was received, the monitor node clock reaching the monitor side time-to-die time, prior to receiving a renew request from the subject node, being indicative of a suspected failure of the subject node. For example, monitor node 803 monitor side time-to-die time 814 based on TTL duration value 819 and the time establish request 822 was received. Monitor side time-to-die time 814 can be a time relative to monitor node 803. If a clock of monitor node 803 reaches monitor side time-to-die time 814, prior to receiving a renew request from subject node 802, monitor node 803 suspects subject node 802 of failure.

The monitor node sending an establish grant to the subject node to indicate to the subject node that the monitor node has agreed to monitor the subject node. For example, monitor node 803 can send establish grant 823 to subject node 802. The subject node receives the establish grant from the monitor node, the establish grant indicative of the monitor node monitoring the subject node. For example, subject node 802 can receive establish grant 823 from monitor node 803. Generally, establish grant 823 indicates that monitor node 803 has agreed to monitor subject node 802. In some embodiments, the establish grant message can include the monitor side TTL duration value. For example, it may be establish grant 823 includes TTL duration value 819.

Alternately, a monitor node can send an establish reject to a subject node to indicate to the subject node that the monitor node has not agreed to monitor the subject node. For example, in response to receiving establish request 822, monitor node 803 can alternately (as indicated by the dashed line) send establish reject 831 to subject node 802. A subject node can receive an establish reject sent from a monitor node. For example, subject node 802 can receive establish reject 831 from monitor mode 803. Establish reject 831 generally indicates to subject node 802 that monitor node 803 has not agreed to monitor subject node 802.

From time to time (and intermingled between the performance of other operations within ring architecture 800), a subject node can renew an established monitoring agreement with a monitor node. Generally, the subject node leaves the existing agreement in force (the current subject-side-time to die time) until a new grant is received. However, the subject node can generate a new TTL duration value and derive what an updated time-to-die time would be. The subject node then sends the new TTL duration value to the monitor node. The monitor node receives the new TTL duration value. When appropriate the monitor node grants the renew request and sends a renew grant back to the subject. The subject node receives the renew grant. In response to receiving the renew grant the subject implements the renewed agreement using the updated time-to-die time as the new current time-to-die time.

Renewal of Monitoring Agreement: In some embodiments, a node renews an established monitoring agreement with another node. Renewing an established monitoring agreement can include the subject node sending a renew request to the monitor node prior to the subject node clock reaching the subject side time-to-die time. For example, subject node 802 can send renew request 815, including TTL duration value 813, to monitor node 803 prior to a clock of subject node 802 reaching subject side time-to-die time 817. In some embodiments, renew request 815 does not include a subject side TTL duration value. In these embodiments, continued use of TTL duration value 813 can be inferred. In other embodiments, TTL duration value 813 is expressly included in renew request 815. In yet other embodiments, a different subject side TTL duration value is included in renew request 815. A new subject side TTL duration value can be generated and used by subject node 802 in response to configuration changes of subject node 702 and/or to configuration changes elsewhere in ring 801 (e.g., changed network conditions).

Node 802 can also calculate what an updated subject side time-to-die time is to be if a corresponding renew grant responsive to renew request 815 is received. The calculation can be based at least on the time renew request 815 was sent and on the subject side TTL duration value related to or associated with renew request 815.

The monitor node receives a renew request from the subject node subsequent to sending the establish grant message and prior to the monitor node clock reaching the monitor side time-to-die time, the renew request indicating that the subject node has not failed. For example, monitor node 803 can receive renew request 815 subsequent to sending establish grant 823 and prior to a clock of monitor node 803 reaching monitor side time-to-die time 814. Reception of renew request 815 can indicate to monitor node 803 that subject node 802 has not failed.

The monitor node grants the renew request to the subject node. For example, monitor node 803 can grant renew request 815.

The monitor node establishes an updated monitor side time-to-die time in response to and based at least on the time the renew request was received, the monitor node clock reaching the updated monitor side time-to-die time, prior to receiving another renew request from the subject node, being indicative of a suspected failure of the subject node. For example, monitor node 803 can establish updated monitor side time-to-die time 821 in response to and based on the time renew request 815 was received and the implied or indicated monitor TTL duration value related to or potentially contained in a renew request 815. Updated monitor side time-to-die time 821 can be a time relative to monitor node 803. Updated monitor side time-to-die time 821 can be subsequent to monitor side time-to-die time 814. However, there is no requirement that monitor side time-to-die time 814 have occurred before establishing updated monitor side time-to-die time 821. Thus, it is also possible that updated monitor side time-to-die time 821 is in fact prior to (or the same as) monitor side time-to-die time 814. If a clock of monitor node 803 reaches updated monitor side time-to-die time 821, prior to receiving another renew request from subject node 802, monitor node 803 suspects subject node 802 of failure.

If no subject side TTL duration value is included in renew request 815 (and thus TTL duration value 813 is inferred) or if renew request expressly includes TTL duration value 813, monitor node 803 can also use TTL duration value 819 to establish updated monitor side time-to-die time 821. On the other hand, if a subject side TTL duration value other than TTL duration value 813 is expressly included in renew request 815, monitor node 803 can use the other expressly included subject side TTL duration value to derive a new monitor side TTL duration value. From the new monitor side TTL duration value, monitor node 803 can then establish updated monitor side time-to-die time 821.

The monitor node sends a renew grant to the subject node to indicate to the subject node that the monitor node has agreed to continue monitoring the subject node. For example, monitor node 803 can send renew grant 827 to subject node 802. The subject node receives the renew grant from the monitor node subsequent to sending the corresponding renew request and prior to the subject node clock reaching the subject side time-to-die time, the renew grant message indicative of the monitor node continuing to monitor the subject node. For example, subject node 802 can receive renew grant 827 from monitor node 803 subsequent to sending renew request 815 and prior to a clock at subject node 802 reaching subject side time-to-die time 817. Generally, renew grant 827 is indicative of monitor node 803 agreeing to continue to monitor subject node 802.

Alternately, a monitor node can send a renew reject to a subject node to indicate to the subject node that the monitor node is no longer agreeing to monitor the subject node. For example, in response to receiving renew request 815, monitor node 803 can alternately (as indicated by the dashed line) send renew reject 833 to subject node 802. A subject node can receive a renew reject sent from a monitor node. For example, subject node 802 can receive renew reject 833 from monitor mode 803. Renew reject 831 generally indicates to subject node 802 that monitor node 803 is no longer agreeing to monitor subject node 802.

The subject node transitions to a previously calculated updated subject side time-to-die time in response to receiving the renew grant, wherein the subject node clock reaching the updated subject side time-to-die time, prior to receiving another renew grant from the monitor node, is an indication of the subject node having to transition to a failure state. For example, subject node 802 can transition to updated subject side time-to-die time 852 when the corresponding renew grant message is received. Updated subject side time-to-die time 852 can have been calculated at around the time renew request 815 was sent to monitor node 803. Updated subject side time-to-die time 852 can have been calculated based on the time corresponding renew request 815 was sent and on the TTL duration related to or associated with renew request 815. Updated subject side time-to-die time 852 can be a time (e.g., subsequent, prior, or equal to subject side time-to-die time 817) relative to subject node 802.

If TTL value 813 is still the appropriate TTL value, subject node 702 can also use TTL duration value 813 to establish updated subject side time-to-die time 852. If another TTL duration value has been generated, subject node 802 can also use the other generated TTL duration value to establish updated subject side time-to-die time 852.

Subsequent, to establishment of a current subject side time-to-die time (either 817 or 852), it may be a clock at subject node 802 reaches the current subject side time-to-die time prior to receiving another renew grant from monitor node 803. This may result from communication errors between subject node 802 and monitor node 803. For example, subject node 802 may send another renew request subsequent receiving renew grant 827 and prior to a clock of subject node 802 reaching updated subject side time-to-die time 852. However, due to communication failures the other renew request does not reach monitor node 803. Alternately, the other renew request may be received at monitor node 803, but the corresponding renew grant from monitor node 803 does not reach subject node 802 due to communication errors. In either event, a clock at subject node 802 may reach a current subject side time-to-die time prior to receiving the corresponding renew grant responsive to the other renew request.

Alternately, subject node 802 can malfunctioning such that subject node 802 is prevented from sending another renew request to monitor node 803 prior to a clock at subject node 802 reaching t updated subject side time-to-die time 852.

However, whether or not a renew request is sent, if a renew grant is not received prior to a clock at subject node 802 reaching a current subject side time-to-die time 852, subject node 802 transitions into a failure state.

Referring back to monitor node 803, it may be that a clock at monitor node 803 reaches a monitor side time-to-die time (either 814 or 821) prior to receiving another renew request from subject node 802 (either due to a malfunction at subject node 802 or to communication errors in ring 801). As a result, monitor node 803 suspects subject node 802 of failure. Monitoring node 803 can transition to a timeout state indicative of detecting a suspected failure at another node.

Figure 8B:
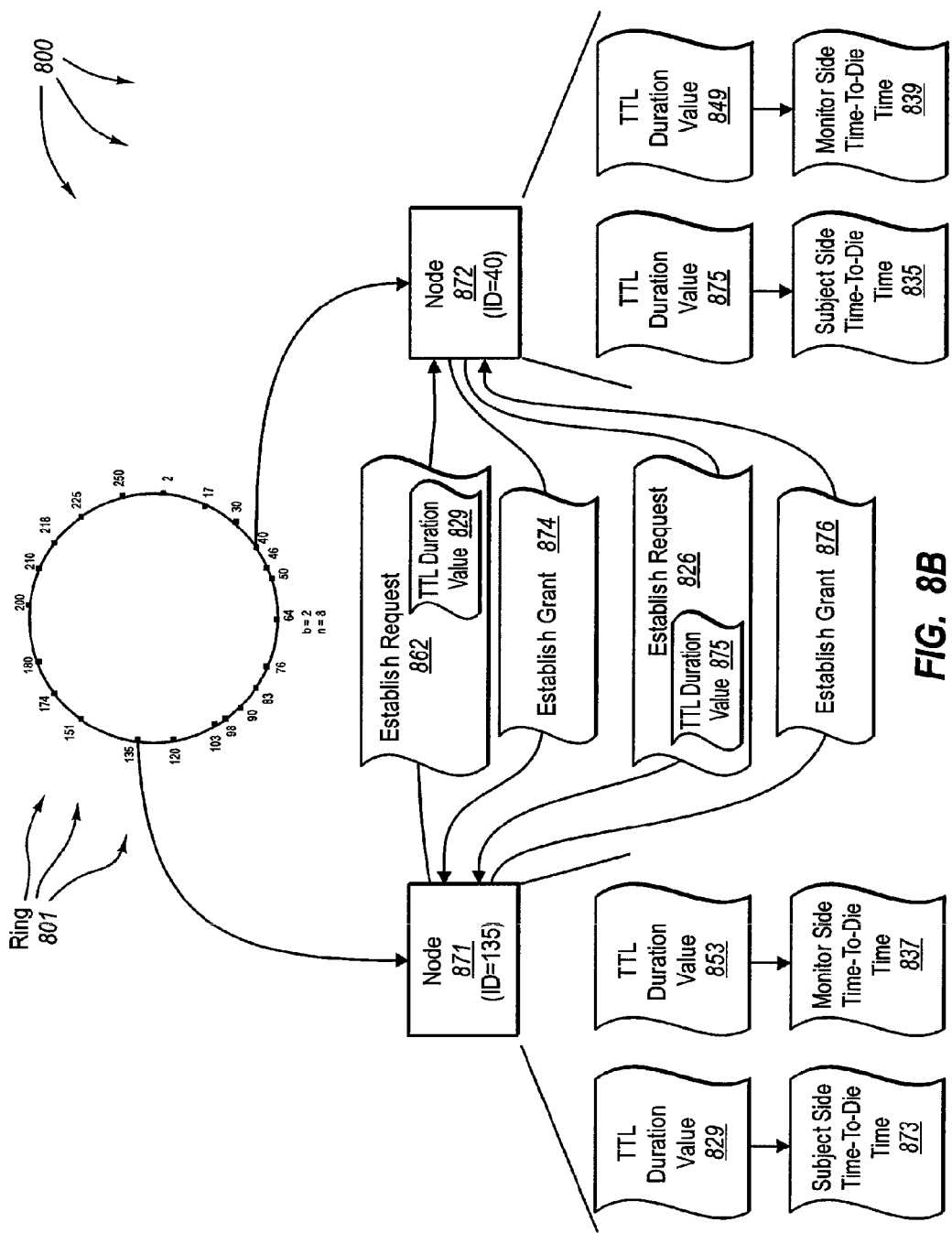
FIG. 8B illustrates an example ring architecture that facilitates two nodes monitoring each other.

Two way monitoring: In other embodiments a pair of nodes can monitor each other. Thus, a first node can monitor a second node and the second node can also monitor the first node. For example, each node can implement both the subject node side and the monitor node side of one-way monitoring through communication with the other node. FIG. 8B illustrates an example ring architecture 800 that facilitates two nodes monitoring each other.

Node 871 can generate TTL duration value 829 for use in monitoring node 871. Node 871 can send establish request 862, including TTL duration value 829, to node 872. Node 871 can also establish subject side time-to-die time 873 based on TTL duration value 829. Node 872 can receive establish request 862, including TTL duration value 829, from node 871. Node 872 can derive TLL duration value 849 from TTL duration value 829. Node 872 can establish monitor side time-to-die time 839 based on TTL duration value 849. Node 872 can send establish grant 874 to node 871. Node 871 can receive establish grant 874 from node 872.

In parallel, node 872 can generate TTL duration value 875 for use in monitoring node 872. Node 872 can send establish request 826, including TTL duration value 875, to node 871. Node 872 can also establish subject side time-to-die time 835 based on TTL duration value 875. Node 871 can receive establish request 826, including TTL duration value 875, from node 872. Node 871 can derive TLL duration value 853 from TTL duration value 833. Node 871 can establish monitor side time-to-die time 837 based on TTL duration value 853. Node 871 can send grant message 876 to node 872. Node 872 can receive grant message 876 from node 871.

Alternately, either of nodes 871 and 872 reject an establish request from the other node. For example, node 871 can reject establish request 862. Likewise, node 872 can reject establish request 826. When either node rejects an establish request, it can send an establish reject (e.g., similar to establish reject 831) to the other node. This indicates to the other node that no monitoring agreement has been established.

Node 871 and node 872 can then exchange renew requests and renew grants (as well as renew rejects similar to renew reject 833) as previously described. Accordingly, each of node 871 and node 872 are both a subject node and a monitor node. Based on the depicted TTL duration values and time-to-die times in FIG. 8B, various events may occur during and/or after the monitor relationships are established.

If a clock at node 871 reaches subject side time-to-die time 873 prior to receiving a renew grant from node 872, node 871 transitions to a failure state. If a clock at node 872 reaches monitor side time-to-die time 839 prior to receiving a renew request from node 871, node 872 suspects node 871 of failure.

If a clock at node 872 reaches subject side time-to-die time 835 prior to receiving a renew grant from node 871, node 872 transitions to a failure state. If a clock at node 871 reaches monitor side time-to-die time 837 prior to receiving a renew request from node 872, node 871 suspects node 872 of failure.

Arbitration of Node Failures

In embodiments that use routing consistency, arbitration of node failures can also be used to facilitate routing consistency. For example, due to various different types of communication errors and node malfunctions, there exists some possibility that each node in a pair of nodes will suspect failure of the other node. Further, each node may suspect that it is functioning properly.

In some ring architectures, portions of resources are configured such that a single node controls a resource at a given moment in time. Further, the needed availability of some resources may also be high such that essentially constant control by a node is required. Thus, when a node fails, control of various resources may need to be transferred to another node. Accordingly, when a node in a pair of nodes suspects the other node of failure, arbitration mechanisms can be used to determine at least which node has or should fail.

For example, when each node in a pair nodes suspects the other node of failing, each node can transition to a timeout state and report their suspicion to an arbitration facility. When in a timeout state, certain other processing at each node can be suspended until the results of the arbitration are received. The arbitration facility can report back to a node indicating if it is to remain active. For example, an arbitration facility can send an accept message to a reporting node that is to remain active. The arbitration facility can send a deny message to a reporting node that is to transition to a failure state. A node that receives an accept message can remain active. A node that doesn't not receive an accept message (e.g., due to network conditions) or that receives a deny message transitions to a failure state.

Figure 8C:
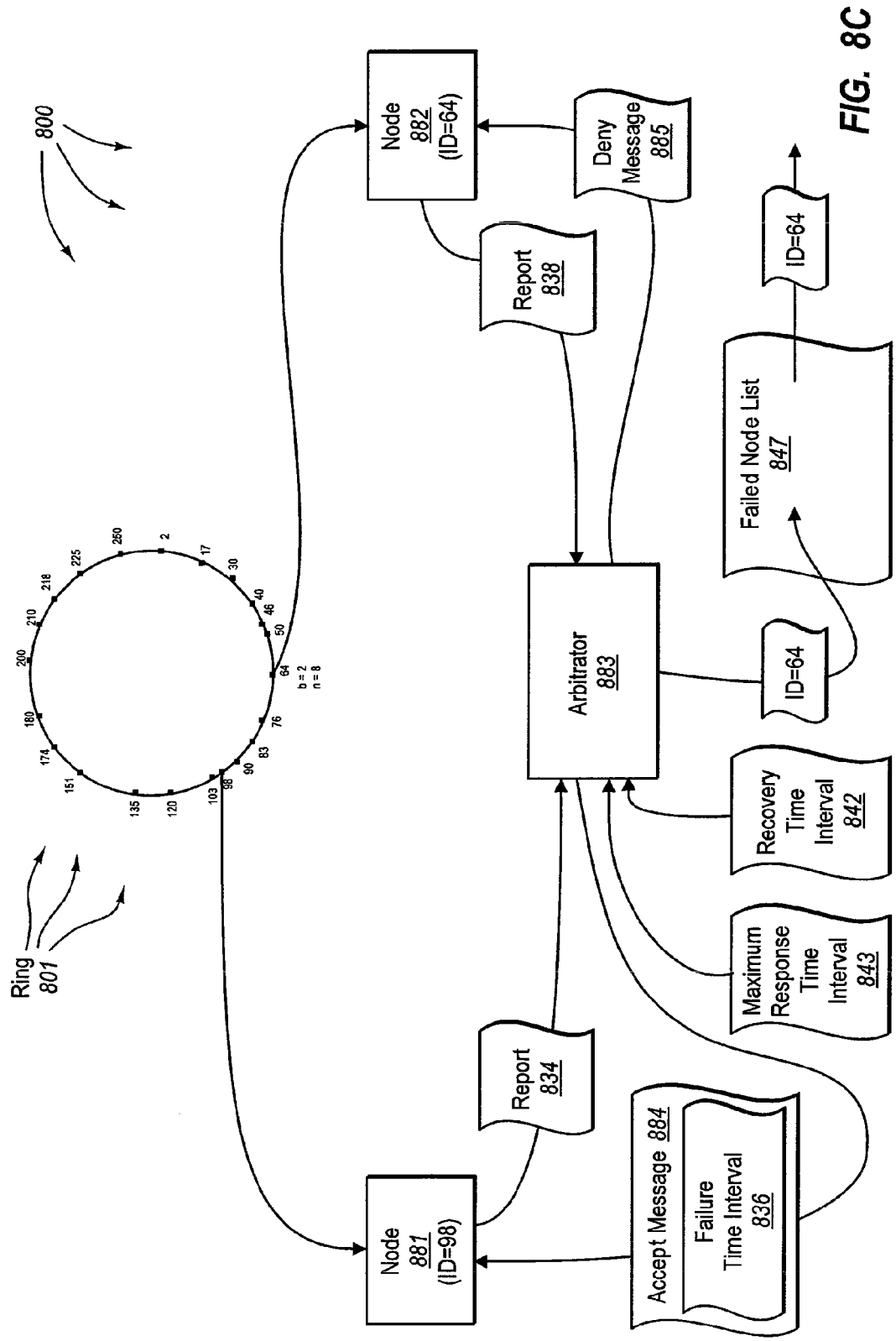
FIG. 8C illustrates an example ring architecture that facilitates arbitration when mutually monitoring nodes can each report that the other node is suspected of failing.

FIG. 8C illustrates example ring architecture 800 that facilitates arbitration when mutually monitoring nodes each can report that the other node is suspected of failing. FIG. 8C depicts an expanded view of node 881 (having ID=98), monitor node 882 (having ID=64), and arbitrator 883.

In some embodiments, arbitrator 883 is also a member of ring 801. In other embodiments, arbitrator 883 is a member of an ancestor ring of ring 801 but is not member of ring 801. In further embodiments, arbitrator 883 is external to the ring hierarchy that includes ring 801. For example, arbitrator 883 can be included in a separate arbitration federation ring of nodes. Nodes in the arbitration federation can be configured as arbitrators for the nodes of ring 801 and its ancestors.

In some embodiments, arbitrator 883 is mutually agreed to by node 871 and node 882 to arbitrate for nodes 881 and 882. In other embodiments, arbitrator 883 is assigned to arbitrate for nodes 881 and 882 by another entity. The other entity can be a node internal to the ring hierarchy including ring 801 (e.g., a seed node) or, for example, a human administrator. For example, the other node can be a member of ring 801 or a member of an ancestor ring of ring 801 but not member of ring 801. Alternately, the other entity can be external the ring hierarchy including ring 801. For example, the other entity can be a node that is a member of separate arbitration federation ring.

Arbitrator 883 can have varying knowledge of the ring hierarchy including ring 801. For example, arbitrator 883 can have global knowledge of the ring hierarchy including ring 801. Alternately, arbitrator 883 can have knowledge of some subset of rings included the ring hierarchy including ring 801. In other embodiments, arbitrator 883 has knowledge of a subset of nodes in ring 801 including (and potentially only) nodes 881 and 882.

Arbitrator 883 can be configured to arbitrate for any number of node pairs including, but not limited to, nodes 881 and 882. In some embodiments, an arbitration mechanism has no knowledge of nodes it is to arbitrate for prior to receiving a report of a suspected node failure. Thus, although a pair of nodes have agreed to use arbitrator 883 or arbitrator 883 has been assigned to arbitrate for a pair of nodes, arbitrator 883 may be unaware of any agreement or assignment prior to receiving a repot of a suspected node failure for a node in the pair of nodes.

Arbitration can include arbitrating between nodes that present conflicting failure reports. For example, when a first node is monitoring a second node and the second node is also monitoring the first node, it may be that each node reports that the other node is suspected of failure. The suspected failure can be detected using virtually any failure detection mechanisms including those previously described in this document.

Failed node list 847 can include a list of nodes that have been reported as suspected failed nodes. Nodes can be report other nodes as suspected failed nodes to arbitrator 883 and, when appropriate, arbitrator 883 can include the reported nodes in failed node list 847. Arbitrator 883 can remove failed nodes from failed node list 847 after appropriate periods of time (e.g., at a future time when the likelihood of continued conflict is not possible). For example, entries in failed node list 847 can be removed at recovery time interval 842 after they were inserted into failed node list 847. Recovery time interval 842 can be long enough to insure that nodes that have been told to fail do fail.

In some embodiments, an arbitrator arbitrates between conflicting reports of suspected node failures. To facilitate arbitration, a first node sending a report to an arbitration facility that a second node is suspected of failing. For example, node 881 can send report 834 to arbitrator 883. The arbitrator receives a report from the first node that the second node is suspected of failing. For example, arbitrator 883 can receive report 834 from node 881.

The arbitrator can determine that no other node has suspected the first node of failing within a specified recovery time interval prior to receiving the report from the first node. For example, arbitrator 883 can determine that no other node has suspected node 881 of failing within recovery time interval 842 (after which arbitrator 883 would have removed node 881 from failed node list 847 anyway). The arbitrator recording in a list that the second node is in a failure state. For example, arbitrator 883 can record in failed node list 847 that node 782 (ID=64) is in a failure state.

The arbitrator sending an accept message to the first node within a maximum response time interval, the accept message including a failure time value indicative of a time period after which the second node is guaranteed to transition into a failure state. For example, arbitrator 883 can send accept message 884 to node 881 within maximum response time interval 843 of receiving report 834. Accept message 884 includes failure time interval 836 indicative of a time when node 882 is guaranteed to have transitioned into a failure state. Generally, a maximum response time interval represents a point in time after which a requestor (e.g., node 881 or 882) assumes the arbitration facility (arbitrator 883) will not answer a request for arbitration (e.g., report 834 or 838). When a maximum response time interval expires at a requestor subsequent to sending a request for arbitration, the requestor performs similar (and potentially identical) operations to those that would be performed if an express deny message was received.

The first node receiving an accept message from the arbitration facility within a maximum response time interval, the accept message including a time value indicative of a time period after which the second node is guaranteed to transition into a failure state. For example, node 881 can receive accept message 884, including failure time interval 836, from arbitrator 883. Failure time interval 836 is indicative of a time when node 882 is guaranteed to have transitioned into a failure state. Thus, after the expiration of failure time interval 836, node 881 can attempt to claim control of one or more ring resources previously controlled by node 882.

The first node claims control of one or more ring resources previously controlled by the second node subsequent to expiration of the time period. For example, node 881 can claim control of one or more ring resources within ring 801 previously controlled by the node 882 subsequent to expiration of failure time interval 836.

Claimed ring resources can vary depending on the ring resources controlled by node 882 prior to transition to a failure state. For example, node 881 can assume message routing responsibilities of node 882 (e.g., the responsibility to receive messages directed to a range of identifies on ring 801), any seed node responsibilities of node 882, any arbitration responsibilities of node 882, etc.

At some time at or after the first node reports the second node, the second node may also suspect the first node of failure. For example, it may be that node 782 also suspects node 881 of failure.

The second node sends a report to the arbitration facility that the first node is suspected of failing. For example, node 882 can send report 838 to arbitrator 883 that node 881 is suspected of failure. The arbitrator receives a report from the second node that the first node is suspected of failing, the report from the second node received within the specified recovery time interval subsequent to receiving the report from the first node. For example, arbitrator 883 can receive report 838 from node 882 that node 881 is suspected of failure within recovery time interval 842 of receiving report 834.

The arbitrator referring to the list to determine that the second node is to transition to a failure state. For example, arbitrator 883 can refer to failed node list 847 to determine that node 882 (ID=64) is to transition to a failure state.

The arbitrator sends a deny message to the second node to cause the second node to transition into a failure state. For example, arbitrator 883 can send deny message 885 to node 882 to cause node 882 to transition to a failure state. The second node receives a deny message from the arbitration facility. For example, node 882 can receive deny message 885 from arbitrator 883.

The second node transitions into a failure state. For example, node 882 can transition into a failure state in response to receiving deny message 885. After failing, node 882 can subsequently attempt to rejoin ring 801.

Thus, embodiments of the invention can be used to replicate queue state within an overlay network and can be used to continue a process at a different node within the overlay network based on replicated queue state. Accordingly, embodiments of the invention can be used to increase the availability of queue state, compensate for node failures within an overlay network, and promote replication of consistent queue state between nodes within an overlay network.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. At a node in an overlay network, the node including a processor and system memory, the overly network including the node and at least one other node, the node and each of the at least one other nodes being assigned responsibility for a range of identifiers on the overlay network, a method for replicating queue state within the overlay network, the method comprising:
   an act of accessing data for a process at the node, the node including a process runtime for running the process and a queue for storing data for the process, the process runtime and the queue co-located within the process;
   an act of altering the queue state for the queue in response to performing a queue related operation on the accessed data; and
   an act of replicating the altered queue state for the queue to the at least one other node on the overlay network, replicating the altered queue state increasing the availability of the altered queue state such that the altered queue state is available at any of the least one other nodes that is subsequently assigned responsibility for the process.

2. The method as recited in claim 1, wherein the act of accessing data for a process at the node comprises an act of accessing data for a workflow having an identifier within a specified range of identifiers.

3. The method as recited in claim 2 wherein, the act of replicating the altered queue state for the queue to a plurality of other nodes on the overlay network comprises an act of sending a queue state message that includes the altered queue state and the identifier.

4. The method as recited in claim 2, further comprising act of detecting a change in the node configuration on the overly network resulting in the identifier being re-assigned to another node on the overlay network.

5. The method as recited in claim 1, wherein the act of accessing data for a process at the node comprises an act of accessing data from a front end node, the front end node providing an interface between the overlay network and at least one other system external to the overlay network.

6. The method as recited in claim 1, wherein the act of replicating the altered queue state for the queue to a plurality of other nodes on the overlay network comprises an act of replicating a message prior to altering the queue state for the queue.

7. The method as recited in claim 1, wherein the overlay network is a ring overlay network and wherein the node is a node on the ring overlay network.

8. The method as recited in claim 1, wherein the act of altering the queue state for the queue in response to performing a queue related operation on the accessed data comprises an act of altering the queue state for the queue in response to performing a queue related operation, the queue related operation selected from among: queuing the accessed data in the queue and dequeueing the accessed data from the queue.

9. A computer program product for use at a node in an overlay network, the node including a processor and system memory, the overly network including the node and at least one other node, the node and each of the at least one other nodes being assigned responsibility for a range of identifiers on the overlay network, the computer program product for implementing a method for replicating queue state within the overlay network, the computer program product comprising one or more computer storage devices having stored thereon computer-executable instructions that, when executed at a processor, cause the node to perform the method, including the following:
   access data for a process at the node, the node including a process runtime for running the process and a queue for storing data for the process, the process runtime and the queue co-located within the process;
   alter the queue state for the queue in response to performing a queue related operation on the accessed data; and
   replicate the altered queue state for the queue to the at least one other node on the overlay network, replicating the altered queue state increasing the availability of the altered queue state such that the altered queue state is available at any of the least one other nodes that is subsequently assigned responsibility for the process.

10. The computer program product as recited in claim 9, wherein computer-executable instructions that, when executed, cause the node to access data for a process at the node comprise computer-executable instructions that, when executed, cause the node to access data for a workflow having an identifier within a specified range of identifiers.

11. The computer program product as recited in claim 10, computer-executable instructions that, when executed, cause the node to replicate the altered queue state for the queue to a plurality of other nodes on the overlay network comprises wherein computer-executable instructions that, when executed, cause the node to send a queue state message that includes the altered queue state and the identifier.

12. The computer program product as recited in claim 10, further comprising computer-executable instructions that, when executed, cause the node to detect a change in the node configuration on the overly network resulting in the identifier being re-assigned to another node on the overlay network.

13. The computer program product as recited in claim 9, wherein computer-executable instructions that, when executed, cause the node to access data for a process at the node comprise computer-executable instructions that, when executed, cause the node to access data from a front end node, the front end node providing an interface between the overlay network and at least one other system external to the overlay network.

14. The computer program product as recited in claim 9, wherein computer-executable instructions that, when executed, cause the node to replicate the altered queue state for the queue to a plurality of other nodes on the overlay network comprise computer-executable instructions that, when executed, cause the node to replicate a message prior to altering the queue state for the queue.

15. The computer program product as recited in claim 9, wherein the overlay network is a ring overlay network and wherein the node is a node on the ring overlay network.

16. The computer program product as recited in claim 9, wherein computer-executable instructions that, when executed, cause the node to alter the queue state for the queue in response to performing a queue related operation on the accessed data comprise computer-executable instructions that, when executed, cause the node to alter the queue state for the queue in response to performing a queue related operation, the queue related operation selected from among: queuing the accessed data in the queue and dequeueing the accessed data from the queue.

17. A network system, the network system comprising:
   an overlay network, the overlay network including a plurality of nodes, each node in the plurality of nodes being assigned responsibility for a range of identifiers on the overlay network;
   each node including one or more processors, system memory, and one or more computer storage devices having stored thereon computer-executable instructions that, when executed at the one or more processors, cause the node to:
      access data for a process at the node, the node including a process runtime for running the process and a queue for storing data for the process, the process runtime and the queue co-located within the process;
      alter the queue state for the queue in response to performing a queue related operation on the accessed data; and
      replicate the altered queue state for the queue to the at least one other node on the overlay network, replicating the altered queue state increasing the availability of the altered queue state such that the altered queue state is available at any of the least one other nodes that is subsequently assigned responsibility for the process.

18. The network system as recited in claim 17, further comprising at least one other external system external to the overlay network; and
   wherein computer-executable instructions that, when executed, cause the node to access data for a process at the node comprise computer-executable instructions that, when executed, cause the node to access data from a front end node, the front end node providing an interface between the overlay network and the at least one other external system.

19. The network system as recited in claim 17, wherein computer-executable instructions that, when executed, cause the node alter the queue state for the queue in response to performing a queue related operation on the accessed data comprise computer-executable instructions that, when executed, cause the node to alter the queue state for the queue in response to performing a queue related operation, the queue related operation selected from among: queuing the accessed data in the queue and dequeueing the accessed data from the queue; and further comprising:
   computer-executable instructions that, when executed, cause the node to process the accessed data to perform some work.

20. The network system as recited in claim 17, wherein the overlay network is a ring overlay network.

* * * * *

UNITED STATES PATENT AND TRADEMARK OFFICE
CERTIFICATE OF CORRECTION

PATENT NO. : 8,166,097 B2  
APPLICATION NO. : 13/215015  
DATED : April 24, 2012  
INVENTOR(S) : Riley et al.

Page 1 of 2

It is certified that error appears in the above-identified patent and that said Letters Patent is hereby corrected as shown below:

In the Drawings

Drawing Sheet 6 of 16, Fig. 4, line 1, delete "Dequeing" and insert -- Dequeuing --, therefor.

Drawing Sheet 7 of 16, Fig. 5, line 1, delete "overly" and insert -- overlay --, therefor.

In the Specification

Column 2, line 47, delete "overly" and insert -- overlay --, therefor.

Column 4, line 37, delete "Overly" and insert -- Overlay --, therefor.

Column 5, line 28, delete "Overly" and insert -- Overlay --, therefor.

Column 6, line 63, delete "overly" and insert -- overlay --, therefor.

Column 6, line 65, delete "overly" and insert -- overlay --, therefor.

Column 8, line 57, delete "overly" and insert -- overlay --, therefor.

Column 14, line 30, delete "overly" and insert -- overlay --, therefor.

Column 15, line 27, delete "overly" and insert -- overlay --, therefor.

Column 15, line 47, delete "overly" and insert -- overlay --, therefor.

Signed and Sealed this  
Third Day of February, 2015

Michelle K. Lee  
*Deputy Director of the United States Patent and Trademark Office*

CERTIFICATE OF CORRECTION (continued)
U.S. Pat. No. 8,166,097 B2

In the Claims

Column 31, line 26, Claim 1, delete "overly" and insert -- overlay --, therefor.

Column 31, line 55, Claim 4, delete "overly" and insert -- overlay --, therefor.

Column 32, line 13, Claim 9, delete "overly" and insert -- overlay --, therefor.

Column 32, line 51, Claim 12, delete "overly" and insert -- overlay --, therefor.

Column 34, line 18, Claim 19, after "node" insert -- to --.